US012236924B2

(12) United States Patent
Takeda

(10) Patent No.: US 12,236,924 B2
(45) Date of Patent: Feb. 25, 2025

(54) CONTROL DEVICE, CONTROL METHOD AND CONTROL SYSTEM

(71) Applicant: Roland Corporation, Shizuoka (JP)

(72) Inventor: Akihiro Takeda, Shizuoka (JP)

(73) Assignee: Roland Corporation, Shizuoka (JP)

( * ) Notice: Subject to any disclaimer, the term of this patent is extended or adjusted under 35 U.S.C. 154(b) by 654 days.

(21) Appl. No.: 17/544,958

(22) Filed: Dec. 8, 2021

(65) Prior Publication Data

US 2023/0024709 A1 Jan. 26, 2023

(30) Foreign Application Priority Data

Jul. 14, 2021 (JP) ................................ 2021-116321

(51) Int. Cl.
*G10H 1/00* (2006.01)
*G10H 1/34* (2006.01)

(52) U.S. Cl.
CPC ......... *G10H 1/0008* (2013.01); *G10H 1/0058* (2013.01); *G10H 1/0075* (2013.01); *G10H 1/0083* (2013.01); *G10H 1/34* (2013.01); *G10H 2220/265* (2013.01); *G10H 2240/311* (2013.01); *G10H 2240/321* (2013.01)

(58) Field of Classification Search
CPC .. G10H 1/0008; G10H 1/0058; G10H 1/0075; G10H 1/0083; G10H 1/34; G10H 2220/265; G10H 2240/311; G10H 2240/321
USPC ........................................................... 84/634
See application file for complete search history.

(56) References Cited

U.S. PATENT DOCUMENTS 9,012,756 B1 * 4/2015 Goldman ............. G10H 1/0066 84/610
9,472,176 B2 * 10/2016 Takahashi ........... H04L 12/6418
9,495,947 B2 * 11/2016 Packouz .............. G10H 1/0066
(Continued)

FOREIGN PATENT DOCUMENTS

CZ 37010 U1 * 4/2023
WO 2012058646 5/2012
(Continued)

OTHER PUBLICATIONS

Florian Bomers, BomeBox(TM) Instructions, Feb. 5, 2019, https://www.bome.com/bome/downloads/manuals/BomeBox_Instructions_2019-02-05.pdf, retrieved from Wayback Machine: https://web.archive.org/web/20211022123149/https:/www.bome.com/bome/downloads/manuals/BomeBox_Instructions_2019-02-05.pdf (Year: 2019).*

(Continued)

*Primary Examiner* — Christina M Schreiber
(74) *Attorney, Agent, or Firm* — JCIPRNET

(57) ABSTRACT

Provided are a control device, a control method and a control system. In a control system, a headphone and a pedal device are in communication with each other through first communication, and the pedal device and a portable terminal are in communication with each other through second communication. Accordingly, even when the headphone can be connected to only one control device, a control instruction from the pedal device can be transmitted to the headphone through the first communication, and a control instruction from the portable terminal can be transmitted to the headphone through the second communication and the first communication.

20 Claims, 17 Drawing Sheets

(56) References Cited

U.S. PATENT DOCUMENTS

| | | | | |
|---|---|---|---|---|
| 10,127,899 | B2 * | 11/2018 | Perez | G10H 1/0091 |
| 2009/0277321 | A1 * | 11/2009 | Sturch | G09B 5/06 84/477 R |
| 2013/0118340 | A1 * | 5/2013 | D'Amours | G10H 1/348 84/746 |
| 2013/0152768 | A1 * | 6/2013 | Rapp | G10H 3/146 84/634 |
| 2014/0033900 | A1 * | 2/2014 | Chapman | G10H 1/0083 84/609 |
| 2014/0280581 | A1 * | 9/2014 | Hernandez | G06F 21/335 709/204 |
| 2014/0331850 | A1 * | 11/2014 | Cho | B42D 9/04 84/602 |
| 2015/0371622 | A1 * | 12/2015 | Beaty | G10H 1/46 84/633 |
| 2016/0044761 | A1 * | 2/2016 | Ahern | G10H 3/146 315/294 |
| 2018/0254030 | A1 * | 9/2018 | Mayo | G10H 1/0008 |
| 2019/0333488 | A1 * | 10/2019 | Wakayama | A63F 13/54 |
| 2021/0201866 | A1 * | 7/2021 | Yokoyama | H04W 68/005 |
| 2021/0201867 | A1 * | 7/2021 | Ishimine | G10H 1/34 |
| 2022/0277716 | A1 * | 9/2022 | Takeda | G10H 1/0066 |
| 2022/0351709 | A1 * | 11/2022 | Schellenberg | G10H 1/32 |
| 2023/0020640 | A1 * | 1/2023 | Takeda | G10H 1/348 |
| 2023/0024709 | A1 * | 1/2023 | Takeda | G10H 1/0008 |
| 2023/0419933 | A1 * | 12/2023 | Yamamoto | G10H 1/348 |
| 2024/0236606 | A1 * | 7/2024 | Ueno | G10H 3/186 |

FOREIGN PATENT DOCUMENTS

| | | | | | |
|---|---|---|---|---|---|
| WO | WO-2012058646 | A1 * | 5/2012 | | G10H 1/0091 |
| WO | WO-2016196829 | A1 * | 12/2016 | | G10H 1/0091 |
| WO | WO-2023181057 | A2 * | 9/2023 | | G10H 1/0066 |

OTHER PUBLICATIONS

Florian Bomers, "BomeBox(TM) Instructions," Feb. 5, 2019, pp. 1-32, Available at: https://www.bome.com/bome/downloads/manuals/BomeBox_Instructions_2019-02-05.pdf.

Florian Bomers, "Bome's Midi Translator," May 1, 2015, pp. 1-77, Available at: https://web.archive.org/web/20150501010115if_/http://www.bome.com:80/bome/downloads/manuals/miditranslator_manual.pdf.

"Search Report of Europe Counterpart Application", issued on May 18, 2022, p. 1-p. 10.

Roland Corporation, "WAZA-AIR Owner's Manual", retrieved on Dec. 2, 2021, with English translation, https://static.roland.com/assets/media/pdf/WAZA-AIR_jpn04_W.pdf.

* cited by examiner

CONTROL DEVICE, CONTROL METHOD AND CONTROL SYSTEM

CROSS-REFERENCE TO RELATED APPLICATION

This application claims the priority benefit of Japan application serial no. 2021-116321, filed on Jul. 14, 2021. The entirety of the above-mentioned patent application is hereby incorporated by reference herein and made a part of this specification.

BACKGROUND

Technical Field

The disclosure relates to a control device, a control method and a control system.

Description of Related Art

In Non-Patent Document 1, a headphone used through pairing with a portable terminal is disclosed. The headphone can control a sound volume, an effect size of built-in sound effect, or the like, according to a touch panel operation on the paired portable terminal.

Non-Patent Documents

[Non-Patent Document 1] [Accessed Jul. 8, 2021] The Internet <URL: https://static.roland.com/assets/media/pdf/WAZA-AIR_jpn04_W.pdf>

In recent years, in electronic musical instruments, there has been an increasing demand to control a sound volume or the like with operations using not only a control device operated by hands such as a portable terminal or the like but also a control device operated by feet such as a pedal device or the like. However, since a headphone in Non-Patent Document 1 has only one control device capable of connection through pairing, the headphone can be controlled from one control device, and the headphone cannot be controlled from a plurality of control devices.

SUMMARY

According to embodiments of the disclosure, the disclosure provides a control device, a control method and a control system that are capable of control of an electronic musical instrument that can be connected to one control device from at least two control devices.

According to an embodiment, a control device of the disclosure is a device configured to control an electronic musical instrument, including: an input unit configured to receive a control instruction; a first communication unit configured to wirelessly communicate with the electronic musical instrument; a second communication unit configured to wirelessly communicate with a second control device that controls the electronic musical instrument; and an instruction transmission unit configured to transmit a control instruction received by the input unit and a second control instruction received from the second control device via the second communication unit to the electronic musical instrument via the first communication unit.

According to an embodiment, a control method of the disclosure is a control method executed by a control device connected to an electronic musical instrument and a second control device configured to control the electronic musical instrument through wireless communication, the method including: an input step of receiving a control instruction; a first communication step of wirelessly communicating with the electronic musical instrument; a second communication step of wirelessly communicating with the second control device configured to control the electronic musical instrument; and an instruction transmission step of transmitting the control instruction input in the input step and a second control instruction received from the second control device in the second communication step to the electronic musical instrument in the first communication step.

According to an embodiment, a control system includes an electronic musical instrument, a second control device configured to control the electronic musical instrument, and a control device connected to the electronic musical instrument and the second control device through wireless communication, wherein the second control device includes a transmission unit configured to transmit a second control instruction to the control device, and the control device includes: an input unit configured to receive a control instruction; a first communication unit configured to wirelessly communicate with the electronic musical instrument; a second communication unit configured to wirelessly communicate with the second control device; and an instruction transmission unit configured to transmit the control instruction received by the input unit and the second control instruction received from the second control device via the second communication unit to the electronic musical instrument via the first communication unit.

DESCRIPTION OF THE EMBODIMENTS

Figure 1:
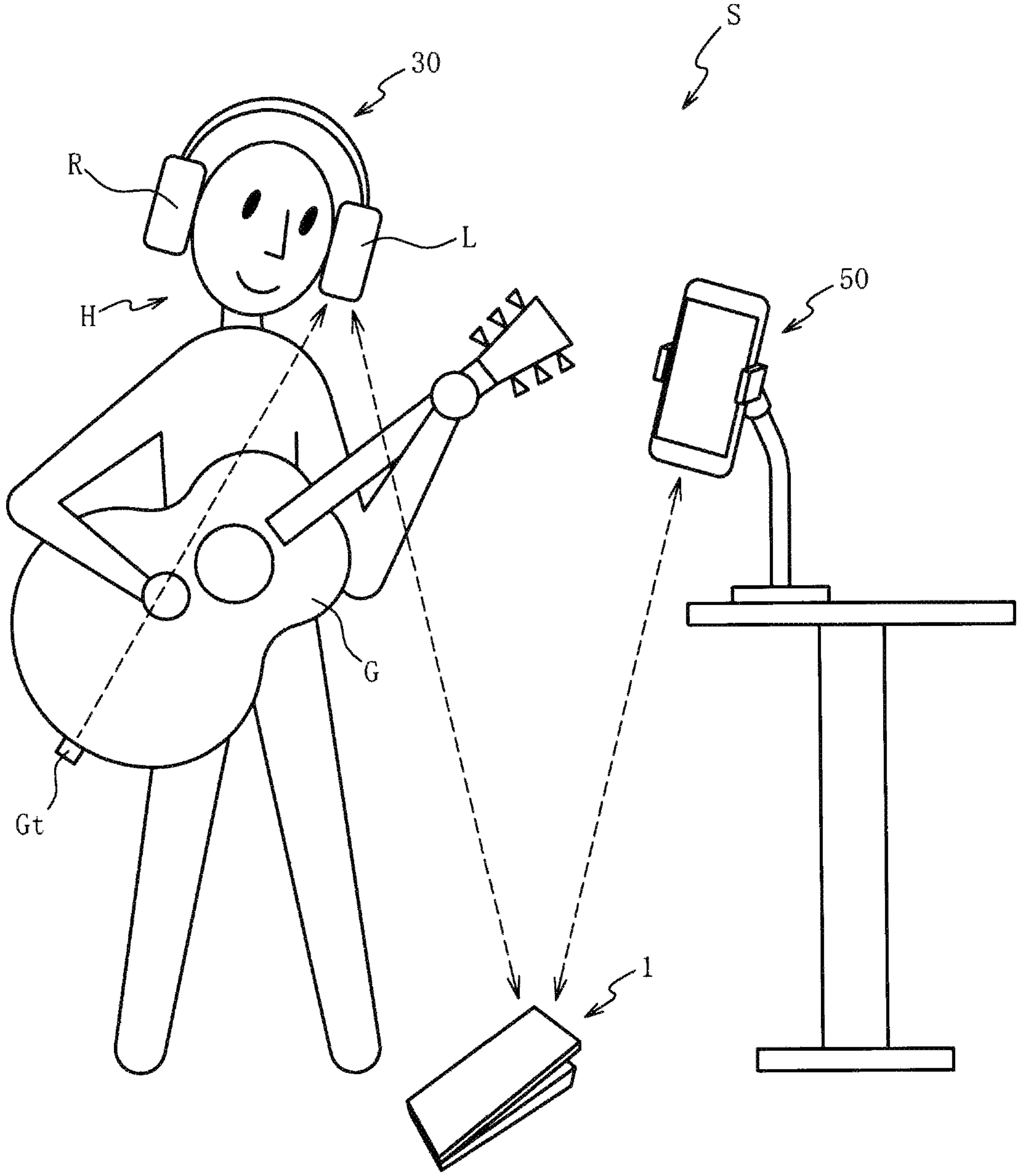
FIG. 1 is a view schematically showing a control system.
Figure 2A:
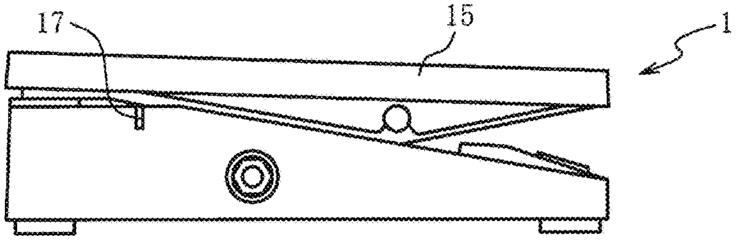
FIG. 2(*a*) is a left side view of a pedal device, FIG. 2(*b*) is a right side view of the pedal device, and FIG. 2(*c*) is a rear view of the pedal device, and FIG. 2(*d*) is an appearance view of a headphone.
Figure 2B:
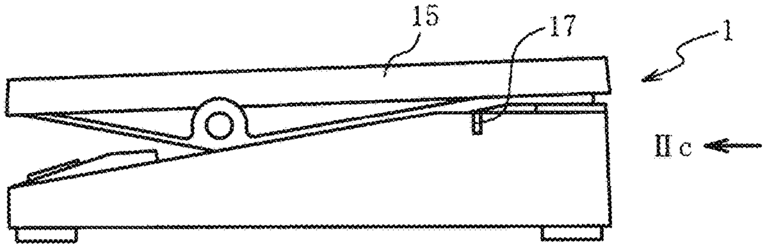
Figure 2C:
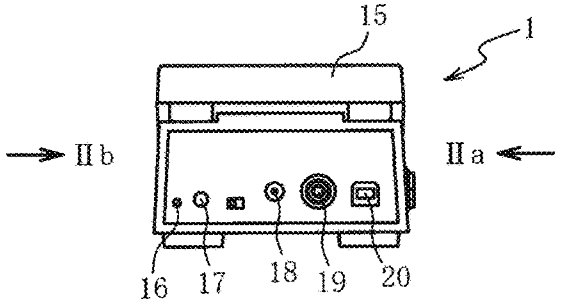
Figure 2D:
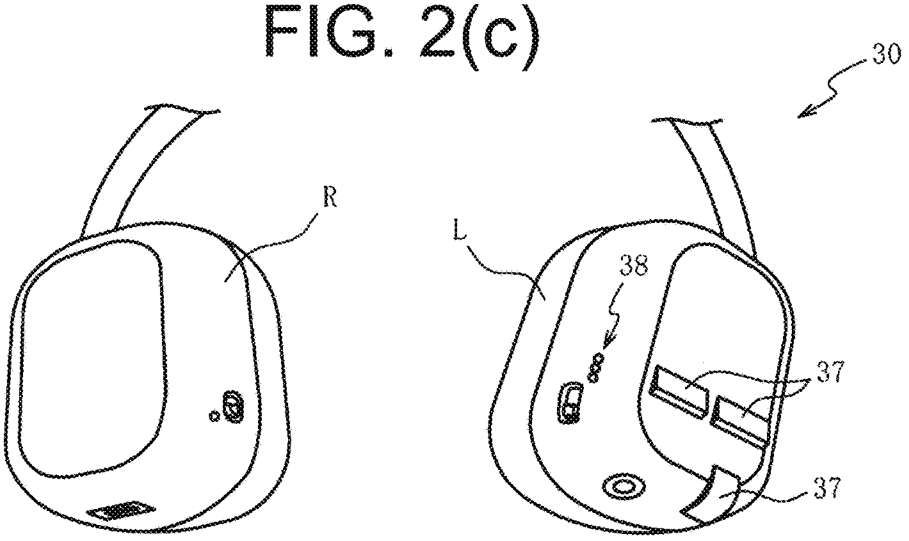

Hereinafter, a preferred example will be described with reference to the accompanying drawings. A control system S of an embodiment will be schematically described with reference to FIG. 1. FIG. 1 is a view schematically showing the control system S. The control system S is constituted by a pedal device 1, a headphone 30, and a portable terminal 50. The pedal device 1 and the headphone 30 are connected by wireless communication, and the pedal device 1 and the portable terminal 50 are also connected by wireless communication.

The pedal device 1 is a device configured to receive an operation of setting (for example, a level of a sound volume, a sound effect, or the like) related to musical performance from a user H who performs music, and create and transmit a control instruction that is information for instructing control to another device (specifically, the headphone 30 and the portable terminal 50) based on parameters according to an operation amount thereof. The pedal device 1 also has a function of transmitting a control instruction transmitted from the portable terminal 50 to the headphone 30, and a function of transmitting a reply to the control instruction of the portable terminal 50 transmitted from the headphone 30 to the portable terminal 50. These transmissions will be described below with reference to FIG. 3 to FIG. 6.

The headphone 30 is an electronic musical instrument configured to output a musical performance sound based on musical performance of an electric guitar G by the user H. The electric guitar G and the headphone 30 are wirelessly connected by a music transmission device Gt connected to the electric guitar G. A musical performance signal output when the user H plays the electric guitar G is transmitted to the headphone 30 via the music transmission device Gt.

In the headphone 30, a musical performance sound according to the received musical performance signal is output from speakers R and L. Here, a sound effect such as delay or distortion can be added to the output musical performance sound, and a degree of the sound effect is changed according to the parameter from the pedal device 1 or the portable terminal 50.

Further, transmission of the musical performance signal to the headphone 30 is not limited to the electric guitar G to which the music transmission device Gt is connected, and for example, may be another electric musical instrument or electronic musical instrument such as an electronic drum, an electronic wind instrument, or the like, to which the music transmission device Gt is connected.

The portable terminal 50 is an information processing device (a computer) configured to transmit a control instruction to the pedal device 1 and the headphone 30. The control instruction input from the portable terminal 50 is transmitted to the headphone 30 via the pedal device 1. Accordingly, it is possible to control the pedal device 1 and the headphone 30 from the portable terminal 50.

Here, a configuration of the pedal device 1 and the headphone 30 will be described with reference to FIG. 2. FIG. 2(*a*) is a left side view of the pedal device 1, FIG. 2(*b*) is a right side view of the pedal device 1, and FIG. 2(*c*) is a rear view of the pedal device 1. A pedal switch 15, an operator 16, an LED 17, a DC input terminal 18, a Musical Instrument Digital Interface (MIDI) output terminal 19 connected to an external MIDI standard device in a wired manner, and a communication terminal 20 connected to an external information processing device in a wired manner are provided on the pedal device 1.

The pedal switch 15 is a device provided on an upper section of the pedal device 1 and configured to detect an angle when stepped on by the user H's foot. The pedal switch 15 is configured like "a seesaw" with a predetermined position as a fulcrum, and the parameter according to the angle of the pedal switch 15 changed when stepped on by the user H's foot is output. The parameter is transmitted to the headphone 30 and the portable terminal 50 through wireless communication. In the embodiment, a MIDI standard control change message (hereinafter, abbreviated as "CC message") configured to include parameters acquired based on the pedal switch 15 is transmitted from the pedal device 1.

The pedal device 1 is configured such that an angle of the pedal switch 15 configured to output a maximum parameter and an angle of the pedal switch 15 configured to output a minimum parameter can be calibrated. In addition, the "number" of the CC messages can be switched to a predetermined value by pushing a tip side (a left side of a drawing of FIG. 2(*a*)) of the pedal switch 15 with a predetermined pedaling force or more.

The operator 16 is an input device configured to receive from the user H an instruction to start pairing with another device or the like, and is provided on a back surface of the pedal device 1. The LED 17 is a device configured to output a state of the pedal device 1 or a connection state of the headphone 30 and the portable terminal 50 through color lighting or flickering, and provided on left and right side surfaces and a back surface of the pedal device 1. The DC input terminal 18 is a terminal configured to input direct current to the pedal device 1, and provided on a back surface of the pedal device 1. Electric power input from the DC input terminal 18 is used for a power source of the pedal device 1. While not shown, when a battery is built in the pedal device 1 and direct current is not input from the DC input terminal 18, electric power supplied from the battery is used for the power source of the pedal device 1.

Further, data transmitted from the pedal device 1 is not limited to the MIDI standard CC message, and may be another MIDI standard message such as a system exclusive message (hereinafter abbreviated as "a SysEx message").

Next, the headphone 30 will be described. FIG. 2(*d*) is an appearance view of the headphone 30. In addition to the speakers R and L, an LED 38 configured to output a state of operators 37 and the headphone 30 or a connection state to the pedal device 1 through color lighting or flickering is provided on the headphone 30.

The plurality of operators 37 are input devices configured to switch a sound volume of a musical performance sound output by the speakers R and L from the user H and a sound effect added to the musical performance sound, are configured to input various instructions such as a connection start instruction or the like to the pedal device 1, and are provided in the headphone 30. When the music is played by the headphone 30, the operator 37 functions to control playing of music such as play/stop, fast forward, or the like.

Next, establishment procedures of communication between the pedal device 1, the headphone 30 and the portable terminal 50, and reception and transmission of information will be described with reference to FIG. 3 to FIG. 6. First, an establishment procedure of communication between the pedal device 1 and the headphone 30 will be described with reference to FIG. 3(*a*).

Figure 3A:
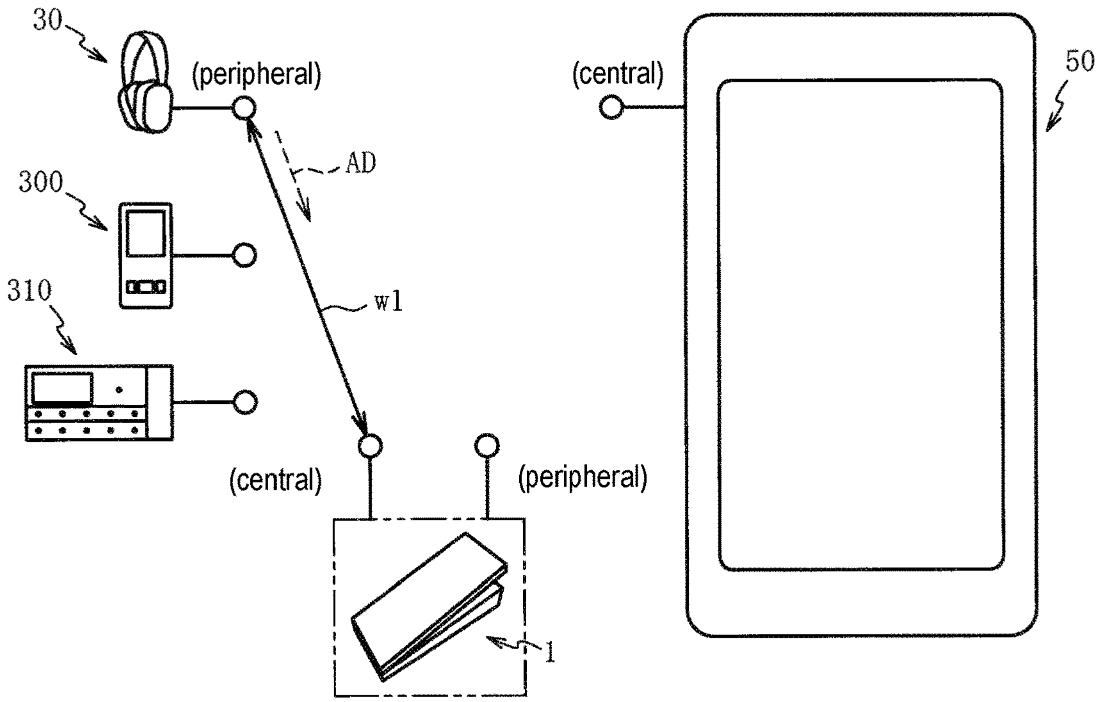
FIG. 3(*a*) is a view for describing an establishment procedure of communication between the pedal device and the headphone, and FIG. 3(*b*) is a view for describing an establishment procedure of communication between the pedal device and the portable terminal.
Figure 3B:
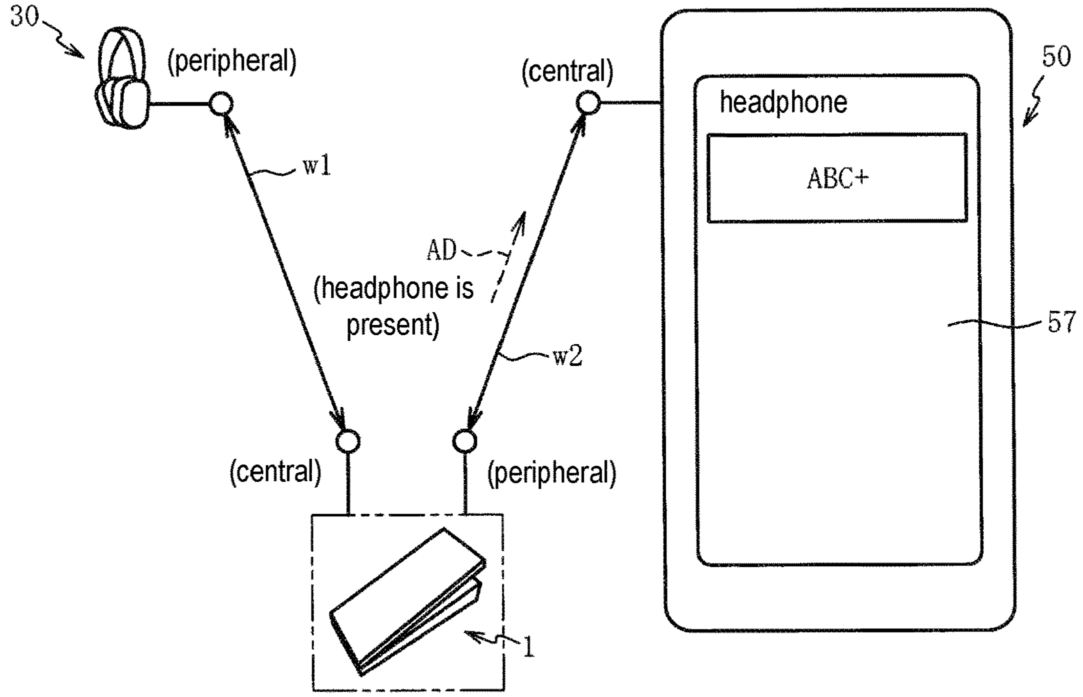

FIG. 3(*a*) is a view for describing the establishment procedure of the communication between the pedal device 1 and the headphone 30. A communication mode is set for a communication device such as the pedal device 1, the headphone 30 and the portable terminal 50 of the embodiment, and communication is performed according to the set communication mode. "Central" in which an instruction to another communication device is performed, and "peripheral" in which a reply according to the instruction from the other communication device set as the center is performed are provided as communication modes.

The portable terminal 50 of the embodiment is set as central, and the headphone 30 is set as peripheral. In the pedal device 1, the peripheral mode is used when communication with the central portable terminal 50 is performed, and the central mode is used when communication with the peripheral headphone 30 is performed. That is, the pedal device 1 is configured to switch between the central and peripheral modes or simultaneously operate them according to a communication mode of the communication partner.

In establishment of communication between the headphone 30 and the portable terminal 50, first, the pedal device 1 attempts to establish communication with the headphone 30 to set as peripheral. Here, the pedal device 1 is regarded as the central communication device, and it is confirmed whether an advertising packet AD is received. The advertising packet AD is a signal transmitted when the peripheral communication device establishes communication with the central communication device. The pedal device 1 establishes communication with a communication device of an origin of the advertising packet AD when the advertising packet AD is received.

In FIG. 3(*a*), when the advertising packet AD transmitted from the headphone 30 is received by the pedal device 1, first communication w1 that is communication with the headphone 30 is established, and the headphone 30 and the pedal device 1 are paired. An operation performed by the user H on the pedal device 1 in this case will be described.

First, when the user H double-clicks the operator 16, a central function and a peripheral function are alternately switched (with a toggle). The central function is a function of connecting the pedal device 1 to the peripheral communication device, and the peripheral function is a function of connecting the pedal device 1 to the central communication device. In the pedal device 1, a lighting color of the LED 17 when the central function is set is white, and a lighting color of the LED 17 when the central function is set is blue.

First, the central function will be described. When the central function is switched to by double-clicking the operator 16, a "reception standby mode" in which reception of the advertising packet AD transmitted from the peripheral communication device, i.e., the headphone 30, is on standby is switched to. In the reception standby mode, the LED 17 flickers slowly with white light.

In a state of the reception standby mode, a "scan mode" in which the advertising packet AD from the headphone 30 is received is switched to by single-clicking the operator 16. In the scan mode, the LED 17 flickers quickly with white light. When pairing with the headphone 30 by receiving the advertising packet AD from the headphone 30 is successful in the scan mode, a "connection complete mode" is switched to. In the connection completion mode, the LED 17 shines with white light. The user H can understand a pairing situation with the headphone 30 according to such white lighting or flickering of the LED 17.

The control instruction from the central pedal device 1 is transmitted to the headphone 30 through the first communication w1 established in this way, and a reply from the headphone 30 to the control instruction is transmitted to the pedal device 1.

Further, establishment of the first communication w1 with the pedal device 1 is not limited to the headphone 30, and may be with another communication device set as peripheral, for example, a portable effecter 300, a type of effecter 310 installed on a floor, or the like, in FIG. 3(*a*). These effecters 300 and 310 are all connected to the electric guitar G (see FIG. 1), and are devices that output the musical performance sound according to the musical performance signal from the electric guitar G in addition to the sound effect.

Next, an establishment procedure of communication between the pedal device 1 and the portable terminal 50 by a peripheral function will be described with reference to FIG. 3(*b*). FIG. 3(*b*) is a view for describing an establishment procedure of communication between the pedal device 1 and the portable terminal 50. The pedal device 1 performs connection to the central communication device, i.e., the portable terminal 50, by the peripheral function.

When the peripheral function is switched to by double-clicking the operator 16, a "transmission standby mode" in which transmission of the advertising packet AD to the portable terminal 50 is on standby is switched to. In the transmission standby mode, the LED 17 flickers slowly with blue light.

In a state of the transmission standby mode, an "advertising mode" in which the advertising packet AD is transmitted to the portable terminal 50 is switched to by single-clicking the operator 16. In the advertising mode, the LED 17 flickers quickly with blue light. In a state of the advertising mode, when the pedal device 1 is paired with the portable terminal 50 in which the transmitted advertising packet AD is received, a "connection complete mode" is switched to. In the connection completion mode, the LED 17 shines with blue light. The user H can understand a pairing situation with the portable terminal 50 according to such blue light or flickering of the LED 17.

A control instruction from the central portable terminal 50 is transmitted to the pedal device 1 through second communication w2 established in this way, and a reply according to the control instruction from the pedal device 1 is transmitted to the portable terminal 50. While both of the first communication w1 and the second communication w2 are performed based on the Bluetooth (registered trademark) Low Energy (BLE) standard in the embodiment, the first communication w1 or the second communication w2 may be performed based on a communication standard other than the BLE standard.

When the second communication w2 is established, from the fact that information indicating that communication with the headphone 30 is established is included in the advertising packet AD, the portable terminal 50 can determine that communication with the headphone 30 via the pedal device 1 is possible. In such a case, "ABC+" is displayed on an LCD 57 of the portable terminal 50. Meanwhile, "ABC" (not shown) is displayed on the LCD 57 when information indicating that communication with the headphone 30 is established is not included in the advertising packet AD.

Here, "ABC" is a name for identifying a device, and for example, a model number, a product ID, or its abbreviation is adopted. The user H can determine at a glance whether the pedal device 1 has completed the communication establishment with the headphone 30 according to "ABC+" or "ABC" displayed on the LCD 57.

Here, whether the portable terminal 50 and the headphone 30 are connected via the pedal device 1 can also be understood by checking a lighting color, or lighting or flickering of the LED 17 of the pedal device 1. Specifically, after it is confirmed from the blue lighting of the LED 17 that the pedal device 1 attempted to pair with and was paired with the headphone 30, by confirming from the white lighting of the LED 17 that the pedal device 1 attempted to pair with and was paired with the portable terminal 50, it can be confirmed that the portable terminal 50 and the headphone 30 are connected. However, since the user H's foot is placed on the pedal device 1, the user H who plays the electric guitar G must put the electric guitar G down once and change his/her posture, such as bending over to see the LED 17.

On the other hand, since the portable terminal 50 can be placed in the hand of the user H, the user H can check whether the pedal device 1 completes communication establishment with the headphone 30 according to the display of "ABC+" or "ABC" without putting the electric guitar that he/she is playing down and further without changing his/her posture. In addition, since the LCD 57 on which these are displayed is more flexible and versatile than the LED 17, it is possible to visually present to the user H whether the headphone 30 and the portable terminal 50 are connected.

Further, the fact that information indicating that communication with the headphone 30 is established is included in the advertising packet AD and the fact that the information is not included are not limited to being displayed on the LCD 57, and for example, they may be output as sound or may be output using another method. When output as sound, the fact that the information is included may be output as "ABC+" and sound, and the fact that the information is not included may be output as "ABC" and sound.

In addition, in the portable terminal 50, between the pedal device 1 and the headphone 30, the communication device used as a control object is configured to be selectable by switching the application (hereinafter abbreviated as "app"). In FIG. 3(*b*), since the app using the headphone 30 as the control object is executed in the portable terminal 50, "headphone" is displayed on the LCD 57. Meanwhile, when the app using the pedal device 1 as the control object is executed in the portable terminal 50, "pedal device" (see FIG. 4(*b*)) is displayed on the LCD 57.

In this way, after the first communication w1 and the second communication w2 are established, an inquiry message IQ of the MIDI standard that is information related to the communication device such as version information or the like of control programs 32*a* and 52*a* (see FIG. 8) is acquired from the communication device of the control object from the portable terminal 50. Acquisition of the inquiry message IQ will be described with reference to FIG. 4.

Figure 4A:
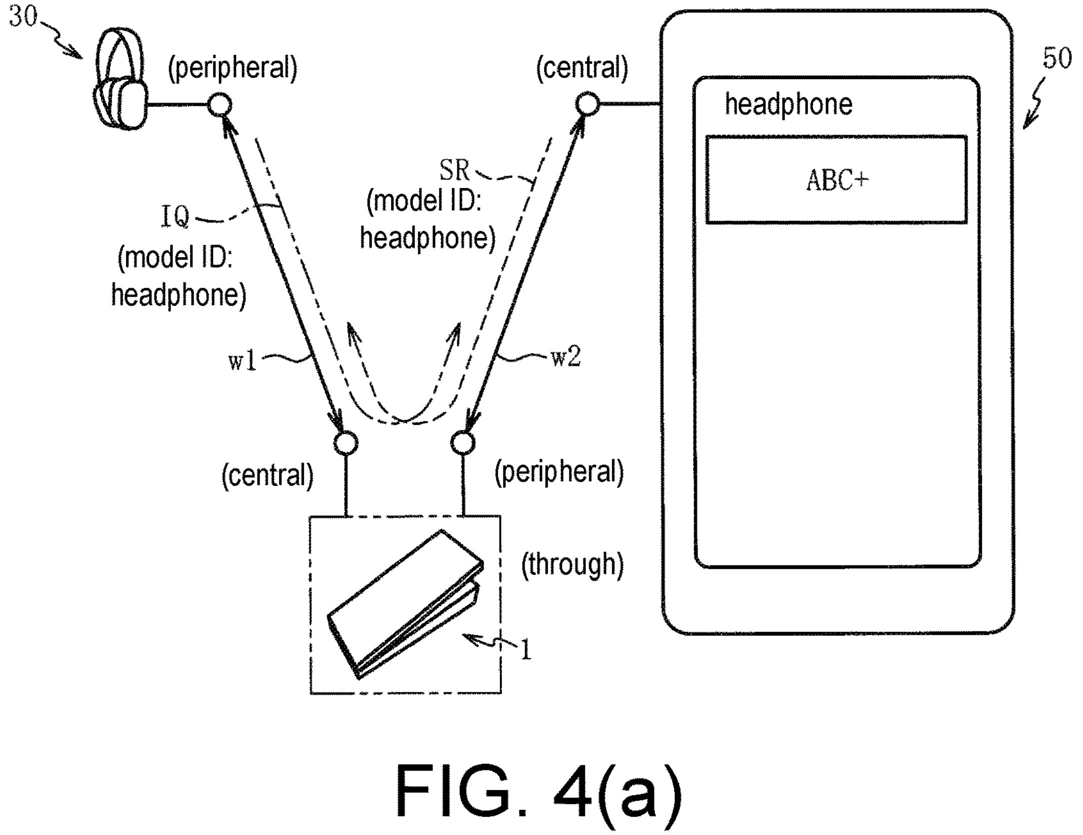
FIG. 4(*a*) is a view for describing acquisition of an inquiry message from a headphone of a portable terminal, and FIG. 4(*b*) is a view for describing acquisition of an inquiry message from the pedal device of the portable terminal.
Figure 4B:
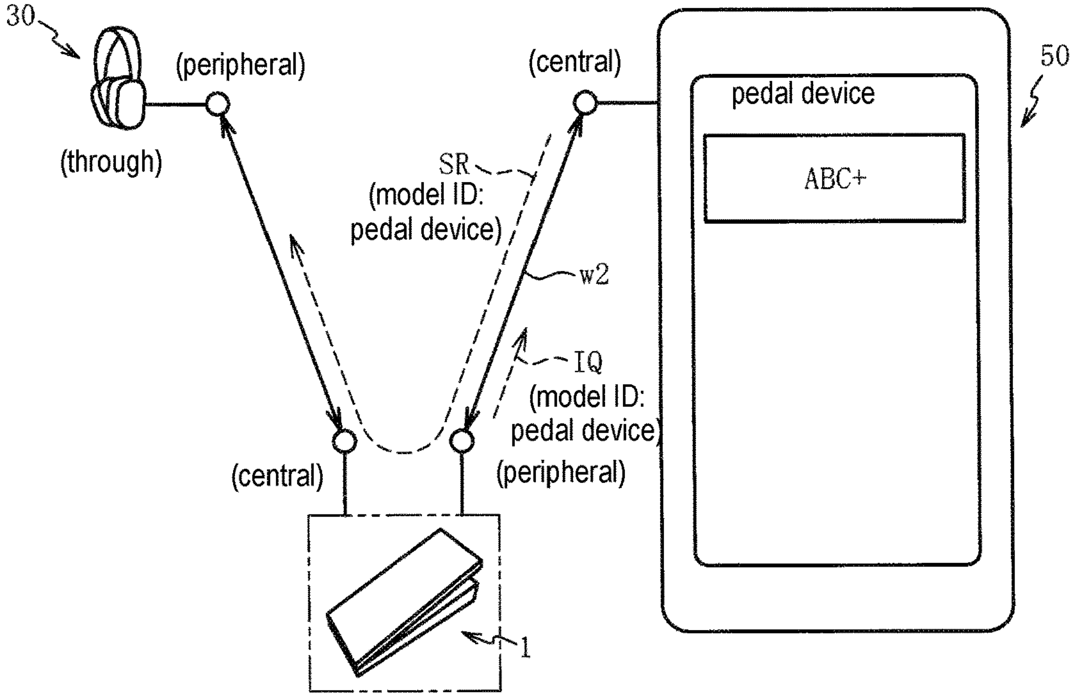

FIG. 4(*a*) is a view for describing acquisition of the inquiry message IQ from the headphone 30 of the portable terminal 50, and FIG. 4(*b*) is a view for describing acquisition of the inquiry message IQ from the pedal device 1 of the portable terminal 50. In FIG. 4(*a*), when the portable terminal 50 requests the inquiry message IQ from the headphone 30, first, the portable terminal 50 creates identity request data SR that instructs a request of the inquiry message IQ.

The identity request data SR includes "model ID" that represents a name or a type of the communication device that requests the inquiry message IQ, i.e., the communication device using the portable terminal 50 as the control object. In FIG. 4(*a*), since the control object of the portable terminal 50 is the headphone 30, a unique ID that specifies the headphone 30 is set as the model ID of the identity request data SR.

First, the identity request data SR created in this way is transmitted to the pedal device 1 in which the portable terminal 50 and the second communication w2 are established. In the pedal device 1, the received identity request data SR is transmitted to the headphone 30 through the first communication w1, and the model ID included in the identity request data SR is confirmed.

In FIG. 4(*a*), since the model ID included in the identity request data SR is "headphone," the pedal device 1 determines that the received identity request data SR does not belong to the object itself, and discards the received identity request data SR. That is, the pedal device 1 causes the received identity request data SR to pass (through) the headphone 30.

When the headphone 30 checks the model ID of the identity request data SR received from the pedal device 1 and it belongs thereto, the inquiry message IQ thereof is transmitted to the pedal device 1. Like the identity request data SR, the model ID of the headphone 30 is included in such an inquiry message IQ.

The pedal device 1 that received the inquiry message IQ from the headphone 30 transmits the inquiry message IQ to the portable terminal 50, and checks whether the model ID included in the inquiry message IQ belongs thereto. In FIG. 4(*a*), since the model ID included in the inquiry message IQ is an ID that specifies the headphone 30, the pedal device 1 determines that the received inquiry message IQ does not belong to the object, and discards the received inquiry message IQ.

The portable terminal 50 that received the inquiry message IQ from the pedal device 1 checks whether the model ID included in the inquiry message IQ belongs thereto. In FIG. 4(*a*), the model ID included in the inquiry message IQ is an ID that specifies the headphone 30. In this case, the portable terminal 50 acquires information related to the headphone 30 included in the inquiry message IQ, and then it is used for a control instruction to the headphone 30.

In addition, as shown in FIG. 4(*b*), like the case in which the control object of the portable terminal 50 is the pedal device 1 and the inquiry message IQ of the pedal device 1 is requested, a unique ID that specifies the pedal device 1 is set as the model ID of the identity request data SR transmitted from the portable terminal 50, and the identity request data SR is transmitted to the pedal device 1.

The pedal device 1 transmits the received identity request data SR to the headphone 30, and checks the model ID of the identity request data SR. In FIG. 4(*b*), since the model ID of the identity request data SR is an ID that specifies the pedal device 1, the inquiry message IQ thereof is transmitted to the portable terminal 50. The model ID of the pedal device 1 is included in such an inquiry message IQ.

The portable terminal 50 that received the inquiry message IQ from the pedal device 1 checks whether the model ID included in the inquiry message IQ belongs thereto, and in FIG. 4(*b*), the model ID included in the inquiry message IQ is an ID that specifies the pedal device 1. In this case, the portable terminal 50 acquires information related to the pedal device 1 included in the inquiry message IQ, and then it is used for a control instruction to the pedal device 1 aft.

Meanwhile, the model ID of the identity request data SR is also checked in the headphone 30 that received the identity request data SR from the pedal device 1. In FIG. 4(*b*), since the model ID of the received identity request data SR is “pedal device” and does not coincide with that of the headphone 30, the received identity request data SR is discarded.

In this way, in the portable terminal 50, after the second communication w2 with the pedal device 1 is established, the inquiry message IQ is acquired from the pedal device 1 or the headphone 30 that is the control object, and then used for the control instruction. Accordingly, immediately after the communication with the control object is established, an appropriate control instruction according to a function or specification included in the control object can be transmitted.

In particular, when the control object of the portable terminal 50 is the headphone 30, it is can be specifically understood that the communication device connected via the pedal device 1 is the headphone 30. In addition, since the version information of the control program 32*a* (see FIG. 8) of the headphone 30 is acquired by the inquiry message IQ, it is possible to check whether the control program 32*a* is updated to a correct version from the portable terminal 50.

Figure 5A:
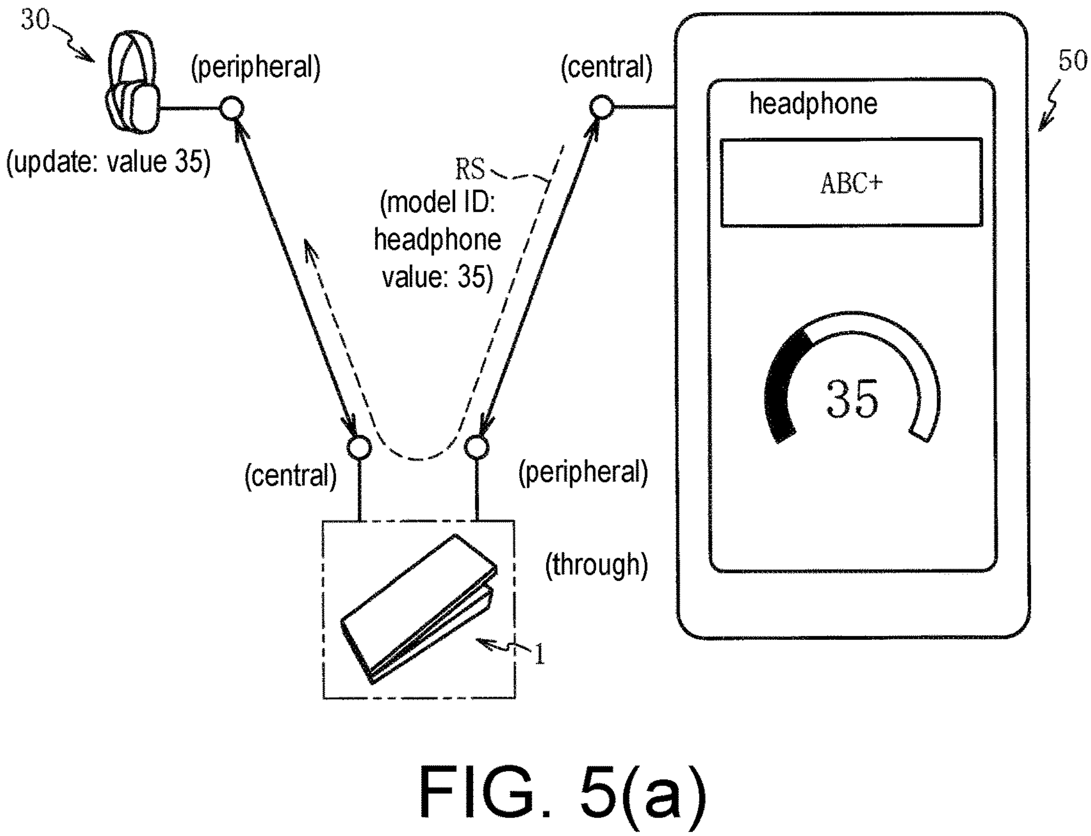
FIG. 5(*a*) is a view for describing control of the headphone with an operation of the portable terminal, and FIG. 5(*b*) is a view for describing control of the pedal device with an operation of the portable terminal.
Figure 5B:
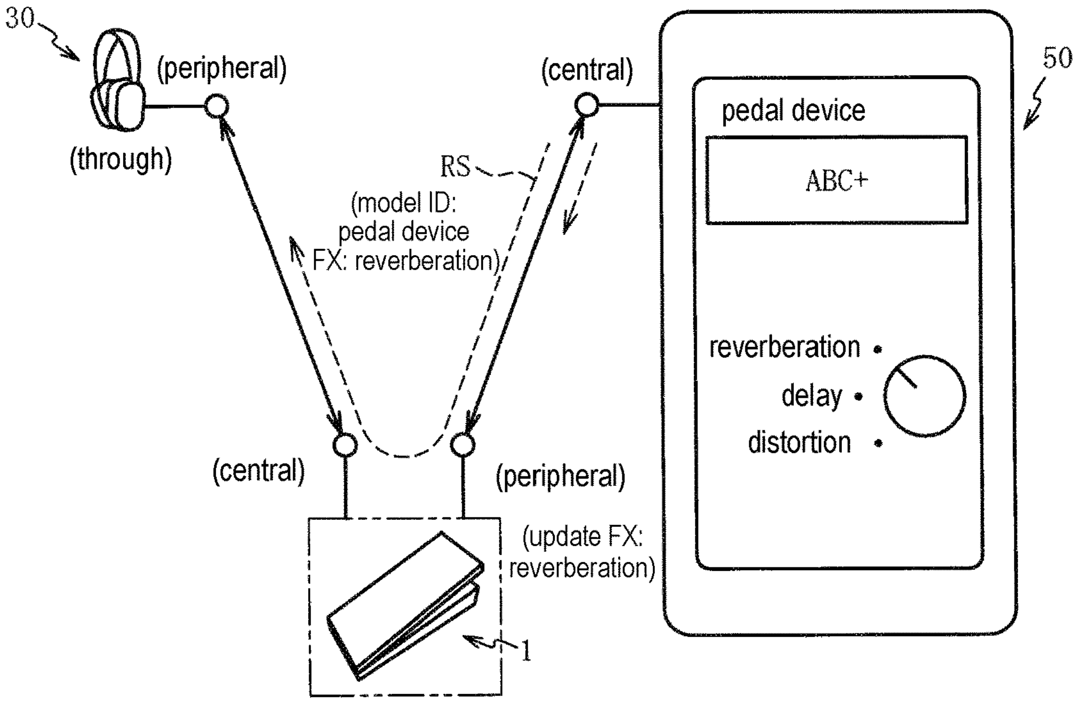

Next, control of the headphone 30 and the pedal device 1 with the operation of the portable terminal 50 will be described with reference to FIG. 5. FIG. 5(*a*) is a view for describing control of the headphone 30 with the operation of the portable terminal 50, and FIG. 5(*b*) is a view for describing control of the pedal device 1 with the operation of the portable terminal 50.

In FIG. 5(*a*), the case in which the sound volume of the musical performance sound output by the headphone 30 from the portable terminal 50 is changed will be exemplified. Further, the object that operates the headphone 30 from the portable terminal 50 is not limited thereto, and for example, a degree of the sound effect of the musical performance sound output by the headphone 30 from the portable terminal 50 may be operated, and other settings of the headphone 30 may be operated.

In FIG. 5(*a*), when an instruction of updating a sound volume of the headphone 30 to 35 is input to the portable terminal 50 from the user H via a touch panel 56 (see FIG. 8), the portable terminal 50 creates a control instruction RS to request the instruction from the headphone 30. The control instruction RS includes an updated parameter (“sound volume/35” in FIG. 5(*a*)) and a model ID of the control object (an ID that specifies the headphone 30 in FIG. 5(*a*)). The portable terminal 50 transmits the MIDI standard SysEx message configured to include such a control instruction RS to the pedal device 1.

The pedal device 1 that received the SysEx message transmits the SysEx message to the headphone 30, and checks the model ID included in the control instruction RS of the SysEx message. In FIG. 5(*a*), since the model ID included in the control instruction RS is an ID that specifies the headphone 30 and is not a request for the pedal device 1, the pedal device 1 discards the received SysEx message.

The headphone 30 that received the SysEx message from the pedal device 1 checks the model ID included in the control instruction RS of the SysEx message. In FIG. 5(*a*), since the model ID included in the control instruction RS is an ID that specifies the headphone 30, the headphone 30 updates the sound volume thereof using the parameter (“sound volume/35”) included in the control instruction RS. Accordingly, the sound volume of the headphone 30 is updated according to the request from the portable terminal 50.

In FIG. 5(*b*), the case in which a type of the sound effect controlled by the pedal device 1 is changed from the portable terminal 50 is exemplified. Further, the change from the portable terminal 50 is not limited to the type of the sound effect controlled with the operation of the pedal device 1. For example, the object controlled by the pedal device 1 may be changed from the sound effect to the sound volume, or may be changed to the other setting items.

In FIG. 5(*b*), when the instruction that changes the sound effect controlled by the pedal device 1 to “reverberation” is input from the user H to the portable terminal 50 via the touch panel 56, the portable terminal 50 creates the control instruction RS including the updated parameter (in FIG. 5(*b*), “sound effect (in the drawings, expressed as “FX”)/reverberation”) and the model ID of the control object (in FIG. 5(*b*), an ID that specifies the pedal device 1). The MIDI standard SysEx message configured to include the created control instruction RS is transmitted to the pedal device 1.

The pedal device 1 that received the SysEx message transmits the SysEx message to the headphone 30, and checks the model ID included in the control instruction RS of the SysEx message. In FIG. 5(*b*), since the model ID included in the control instruction RS is an ID that specifies the pedal device 1, the pedal device 1 changes the sound effect controlled with the operation of the pedal switch 15 thereof using the parameter (“sound effect/reverberation”) included in the control instruction RS. Accordingly, the sound effect controlled by the pedal device 1 is changed according to the request from the portable terminal 50.

Figure 6A:
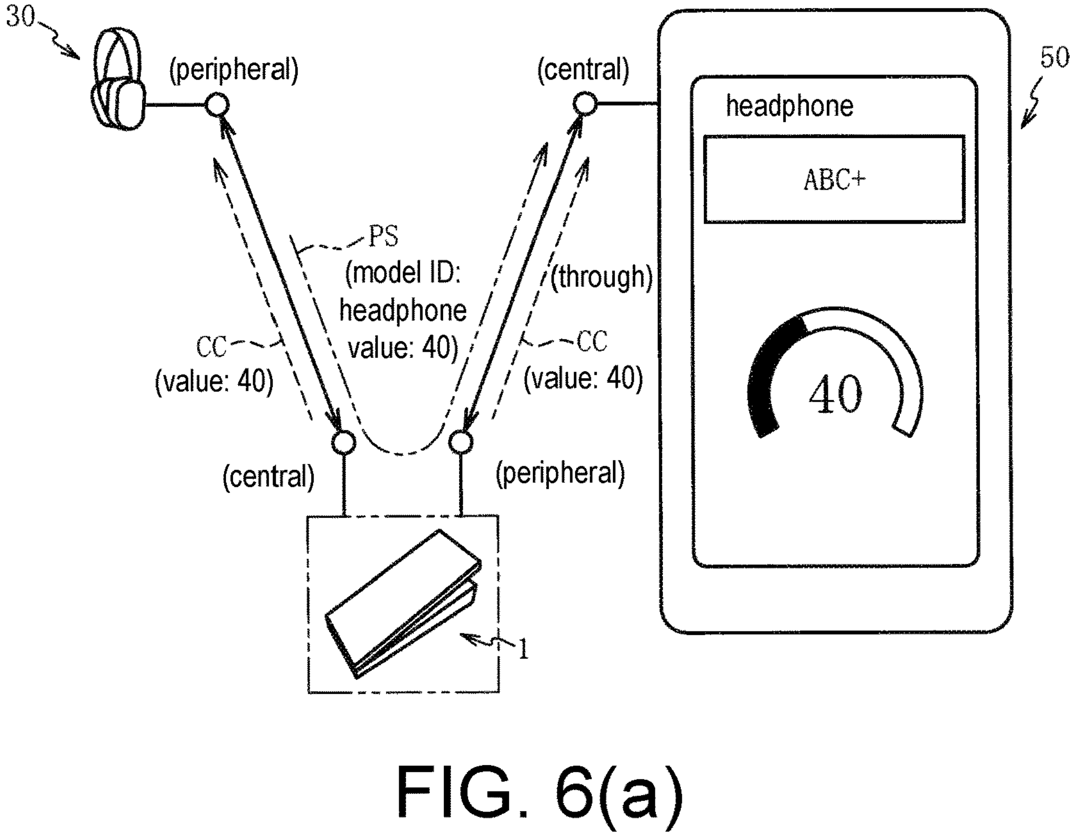
FIG. 6(*a*) is a view for describing control of the headphone with an operation of the pedal device, and FIG. 6(*b*) is a view for describing a case in which transmission timings of a control instruction and an update instruction overlap.
Figure 6B:
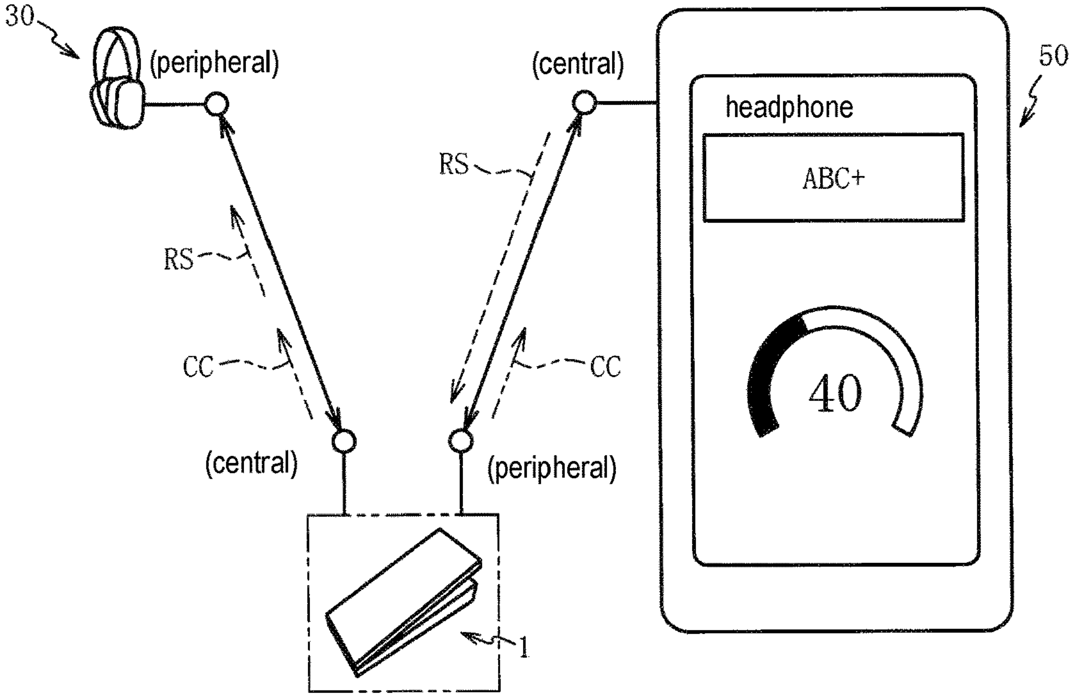

Next, control of the headphone 30 with the operation of the pedal device 1 will be described with reference to FIG. 6(*a*). FIG. 6(*a*) is a view for describing control of the headphone 30 with the operation of the pedal device 1. In FIG. 6(*a*), update of the sound volume of the headphone 30 according to the operation of the pedal switch 15 of the pedal device 1 is exemplified. Here, it is assumed that the app using the headphone 30 as the control object is also executed in the portable terminal 50.

When the pedal switch 15 of the pedal device 1 is pushed by the user H’s foot, the parameter according to the angle of the pedal switch 15 is transmitted to the headphone 30 and the portable terminal 50. Here, the MIDI standard CC message including the acquired parameter is transmitted to the headphone 30 and the portable terminal 50.

The headphone 30 updates the sound volume thereof using the parameter included in the update instruction CC when the CC message including the update instruction CC is received from the pedal device 1.

Then, the parameter included in the update instruction CC and a reply instruction PS including the model ID thereof are created, and the MIDI standard SysEx message including the reply instruction PS is transmitted to the pedal device 1.

The pedal device 1 that received the SysEx message including the reply instruction PS transmits the SysEx message to the portable terminal 50, and checks the model ID included in the reply instruction PS of the SysEx message. In FIG. 6(*a*), since the model ID included in the reply instruction PS is an ID that specifies the headphone 30 and not the request for the pedal device 1, the pedal device 1 discards the received SysEx message.

In the portable terminal 50, the SysEx message including the update instruction CC and the reply instruction PS is transmitted from the pedal device 1. Among these, while the portable terminal 50 discards the update instruction CC, the SysEx message including the reply instruction PS is acquired. When the model ID of the reply instruction PS of the acquired SysEx message is checked and coincides with the control object thereof (in FIG. 6(*a*), the headphone 30), corresponding settings (in FIG. 6(*a*), sound volume) are updated using the parameters of the reply instruction PS.

That is, in the portable terminal 50, while the update instruction CC based on the pedal switch 15 from the pedal device 1 is discarded, the settings thereof are updated by the reply instruction PS transmitted when the parameters are updated based on the update instruction CC based on the pedal switch 15 from the pedal device 1 in the headphone 30. Accordingly, the settings of the portable terminal 50 are updated when the settings of the headphone 30 are updated by the update instruction CC of the pedal device 1. Accordingly, the update instruction CC of the pedal device 1 can be reliably reflected in the settings of the headphone 30 and the portable terminal 50.

Here, in general, the headphone 30 can only communicate with one communication device. On the other hand, in the control system S of the embodiment, the headphone 30 and the pedal device 1 in communication with each other through the first communication w1, and the pedal device 1 and the portable terminal 50 are in communication with each other through the second communication w2.

Accordingly, the control instruction from the central pedal device 1 can be transmitted to the headphone 30, and the control instruction from the central portable terminal 50 can be transmitted to the headphone 30 through the second communication w2 and the first communication w1. Accordingly, since flexible functions by the portable terminal 50, the pedal device 1 and the headphone 30 can be provided and two of the pedal device 1 and the central portable terminal 50 and the one peripheral headphone 30 can be in communication with each other without through another communication device, the configuration of the communication device and its costs can be minimized.

In addition, the first communication w1 and the second communication w2 of the embodiment can transmit the control instruction RS from the portable terminal 50 and the update instruction CC from the pedal device 1 through the same communication route.

Incidentally, in the embodiment, since the control instruction RS or the update instruction CC can be input from each of the pedal device 1 and the portable terminal 50, in the pedal device 1, a timing when the control instruction RS from the portable terminal 50 is transmitted to the headphone 30 and a timing when the update instruction CC is transmitted to the headphone 30 based on the pedal switch 15 may overlap each other. Processing in such a case will be described with reference to FIG. 6(*b*).

FIG. 6(*b*) is a view for describing a case in which transmission timings of the control instruction RS and the update instruction CC overlap each other. FIG. 6(*b*) shows a case in which the control instruction RS from the portable terminal 50 is first transmitted to the headphone 30 by the pedal device 1, the pedal switch 15 is operated during transmission thereof, and the update instruction CC is created based on this.

In such a case, after transmission of the control instruction RS that is transmitted in advance is completed, transmission of the update instruction CC is started. Accordingly, even in the case in which timings when the control instruction RS and the update instruction CC from the pedal device 1 are transmitted to the headphone 30 overlap each other, transmission of the control instruction RS and the update instruction CC to the headphone 30 can be reliably completed without missing both or one of them.

Figure 7:
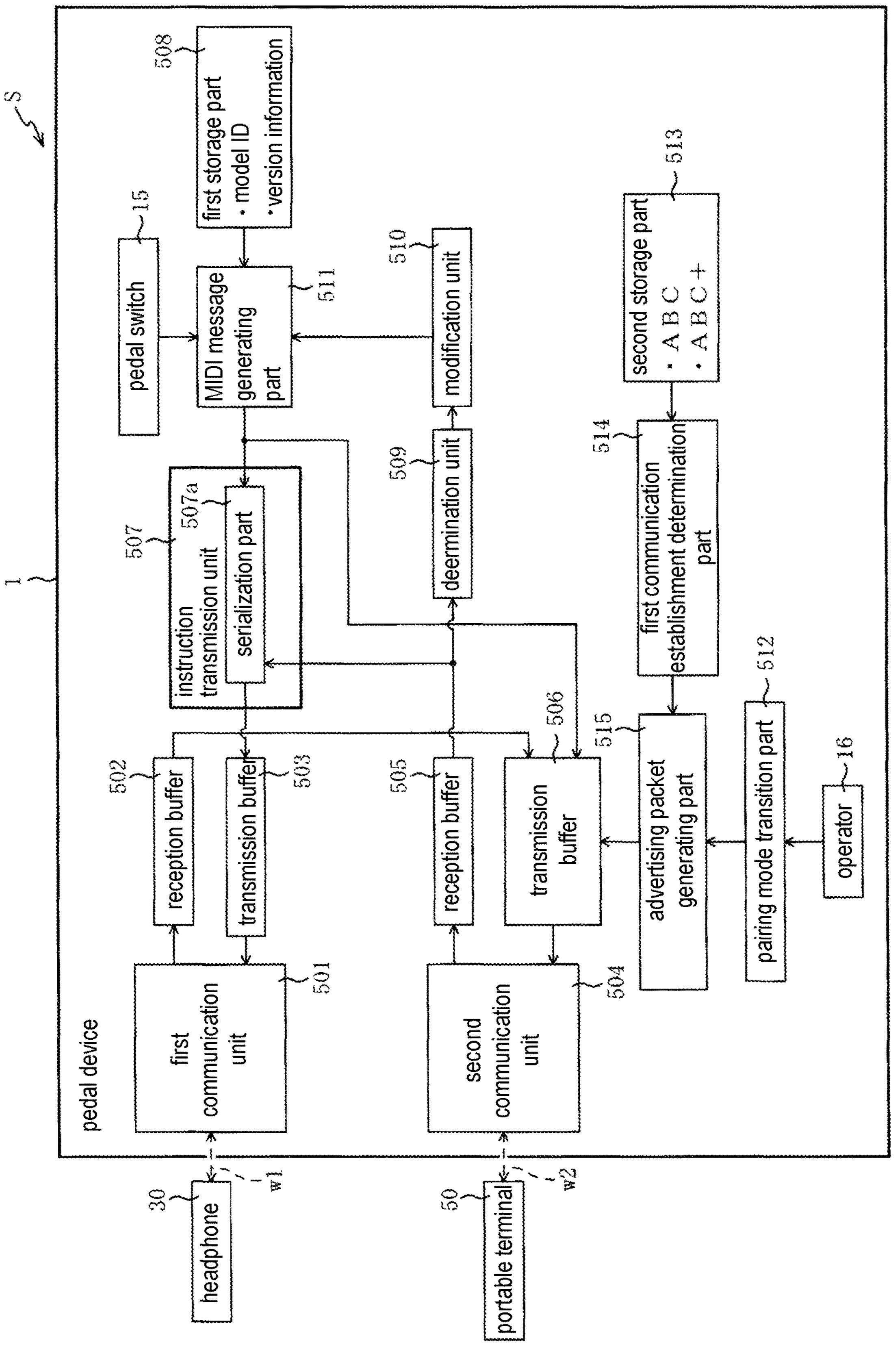
FIG. 7 is a function block diagram of the pedal device.

Next, a function of the pedal device 1 will be described with reference to FIG. 7. FIG. 7 is a function block diagram of the pedal device 1. As shown in FIG. 7, the pedal device 1 has a first communication unit 501, a reception buffer 502, a transmission buffer 503, a second communication unit 504, a reception buffer 505, a transmission buffer 506, an instruction transmission unit 507, the pedal switch 15, a first storage part 508, a determination unit 509, a modification unit 510, a MIDI message generating part 511, the operator 16, a pairing mode transition part 512, a second storage part 513, a first communication establishment determination part 514, and an advertising packet generating part 515.

Figure 8:
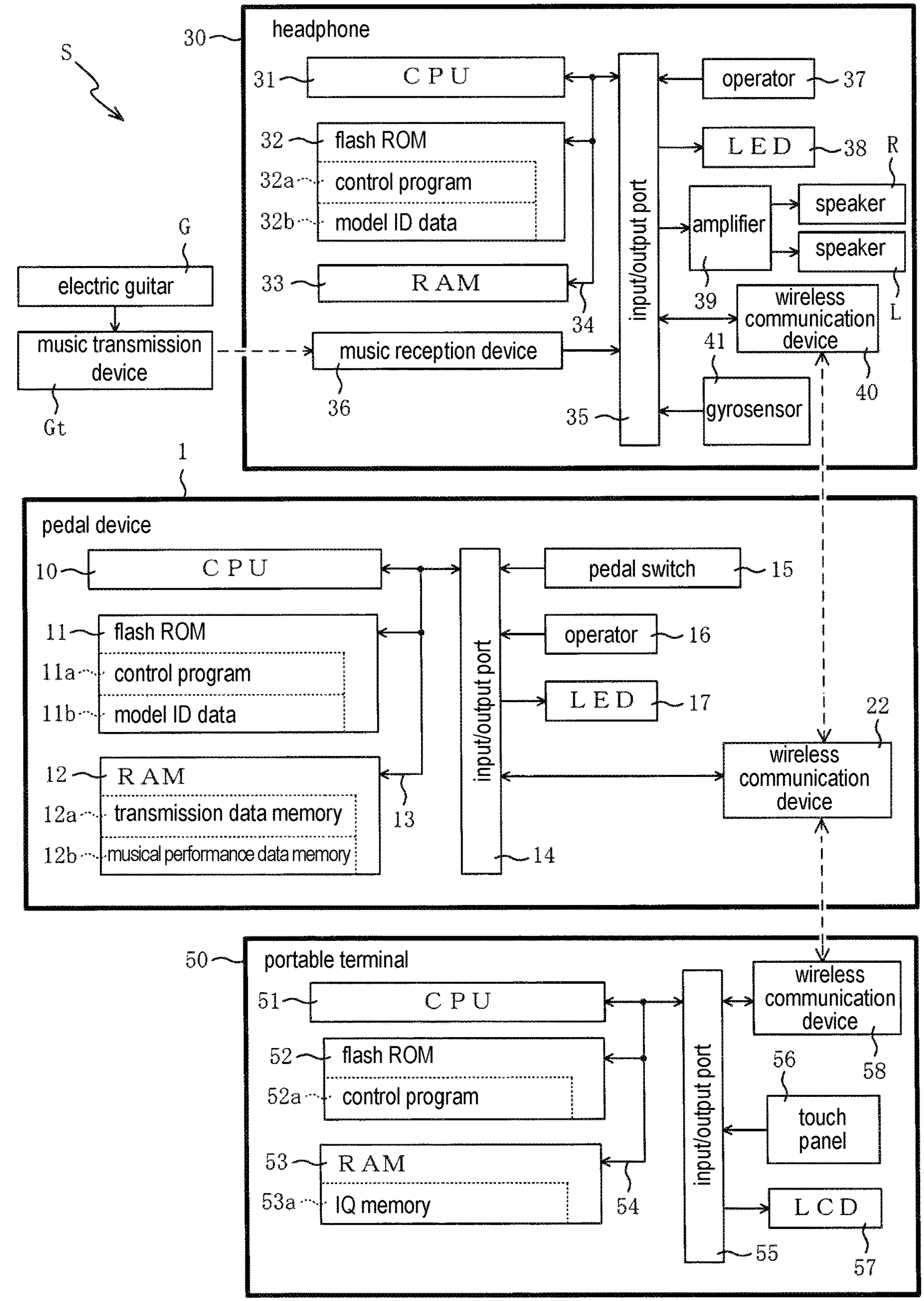
FIG. 8 is a block diagram showing an electric configuration of a control system.

The first communication unit 501 is a unit configured to wirelessly communicate with the headphone 30, and realized by a CPU 10, which will be described below in FIG. 8. The reception buffer 502 is configured to temporarily store data received by the first communication unit 501, and realized by a RAM 12, which will be described below in FIG. 8. The transmission buffer 503 is configured to temporarily store data transmitted from the first communication unit 501 and realized by the RAM 12.

The second communication unit 504 is a unit configured to wirelessly communicate with the portable terminal 50, and realized by the CPU 10. The reception buffer 505 is configured to temporarily store data received by the second communication unit 504, and realized by the RAM 12. The transmission buffer 506 is configured to temporarily store data transmitted from the second communication unit 504, and realized by the RAM 12. In addition, data such as a SysEx message from the headphone 30 received by the first communication unit 501 and stored in the reception buffer 502 is transmitted to the transmission buffer 506, and the data is transmitted to the portable terminal 50 from the transmission buffer 506 via the second communication unit 504.

The instruction transmission unit 507 is a unit configured to transmit a CC message (a control instruction) created by the MIDI message generating part 511 based on the input from the pedal switch 15 and a SysEx message (a second control instruction) received from the portable terminal 50 via the second communication unit 504 to the headphone 30 via the first communication unit 501, and realized by the CPU 10. The instruction transmission unit 507 has a serialization part 507*a* configured to convert the CC message created by the MIDI message generating part 511 and the SysEx message received from the portable terminal 50 via the second communication unit 504 into serial data. The CC message and the SysEx message converted into the serial data by the serialization part 507*a* are transmitted to the headphone 30 via the transmission buffer 503 and the first communication unit 501.

In this way, the CC message based on the input from the pedal switch 15 and the SysEx message received from the portable terminal 50 via the second communication unit 504 are transmitted to the headphone 30 via the first communication unit 501. Accordingly, even when the headphone 30 is only connected to one control device, the headphone 30 can be controlled from two control devices of the pedal device 1 and the portable terminal 50.

Further, the CC message created by the MIDI message generating part 511 and the SysEx message received from the portable terminal 50 via the second communication unit 504 are converted into serial data by the serialization part 507*a*, and the CC message and the SysEx message can be transmitted through the same communication route of the first communication unit 501.

Next, creation of the CC message will be described. The first storage part 508 is configured to store the model ID or the version information of the pedal device 1, and realized by a flash ROM 11, which will be described below in FIG. 8. The determination unit 509 is a unit configured to determine whether the SysEx message received from the portable terminal 50 via the second communication unit 504 and the reception buffer 505 is a control instruction thereto, and realized by the CPU 10.

The modification unit 510 is a unit configured to change the CC message generated by the MIDI message generating part 511 based on the pedal switch 15 according to the SysEx message when the SysEx message received by the determination unit 509 via the second communication unit 504 is a control instruction thereto, and realized by the CPU 10.

The MIDI message generating part 511 is configured to create the CC message based on the parameter input from the pedal switch 15 and the model ID or the version information of the first storage part 508, and realized by the CPU 10. In the MIDI message generating part 511, when it is determined by the modification unit 510 that the SysEx message received by the determination unit 509 via the second communication unit 504 is the control instruction thereto, the CC message generated by the MIDI message generating part 511 based on the pedal switch 15 is changed according to the SysEx message. Accordingly, the control object controlled based on the operation of the pedal switch 15 can be changed by the SysEx message from the portable terminal 50.

Next, an operation upon establishment of communication with the portable terminal 50 will be described. The pairing mode transition part 512 is configured to determine whether it is transited to the advertising mode in FIG. 3(*b*) by double-clicking or single-clicking the operator 16, and realized by the CPU 10. The second storage part 513 is configured to store information of the pedal device 1 ("ABC"), information of the pedal device 1 and information showing establishment of communication with the headphone 30 ("ABC+"), and realized by the flash ROM 11.

The first communication establishment determination part 514 is configured to acquire information from the second storage part 513 according to whether communication with the headphone 30 is established by the first communication unit 501, and realized by the CPU 10. Specifically, the first communication establishment determination part 514 acquires information of the pedal device 1 from the second storage part 513 when communication with the headphone 30 is not established by the first communication unit 501, and acquires information of the pedal device 1 from the second storage part 513 and information that communication with the headphone 30 is established when communication with the headphone 30 is established by the first communication unit 501.

The advertising packet generating part 515 is configured to create the advertising packet AD based on the information acquired from the first communication establishment determination part 514 when it is determined that the mode is transited to the advertising mode by the pairing mode transition part 512 and transmit the advertising packet AD to the portable terminal 50 via the second communication unit 504, and realized by the CPU 10. The advertising packet AD generated by the advertising packet generating part 515 is transmitted to the portable terminal 50 via the transmission buffer 506 and the second communication unit 504.

That is, the advertising packet AD transmitted from the advertising packet generating part 515 to the portable terminal 50 includes information showing that information of the pedal device 1 and communication with the headphone 30 are established when communication with the headphone 30 is established by the first communication unit 501. Accordingly, it can be determined that the portable terminal 50 connected to the headphone 30 is communicable with the headphone 30 via the pedal device 1 in actuality.

Next, an electric configuration of the control system S will be described with reference to FIG. 8. FIG. 8 is a block diagram showing the electric configuration of the control system S. The headphone 30 has a CPU 31, a flash ROM 32, and a RAM 33, which are connected to an input/output port 35 via a bus line 34. A music reception device 36, the operator 37 and the LED 38, an amplifier 39, a wireless communication device 40 in wireless communication with the pedal device 1, and a gyrosensor 41 are further connected to the input/output port 35.

Figure 9:
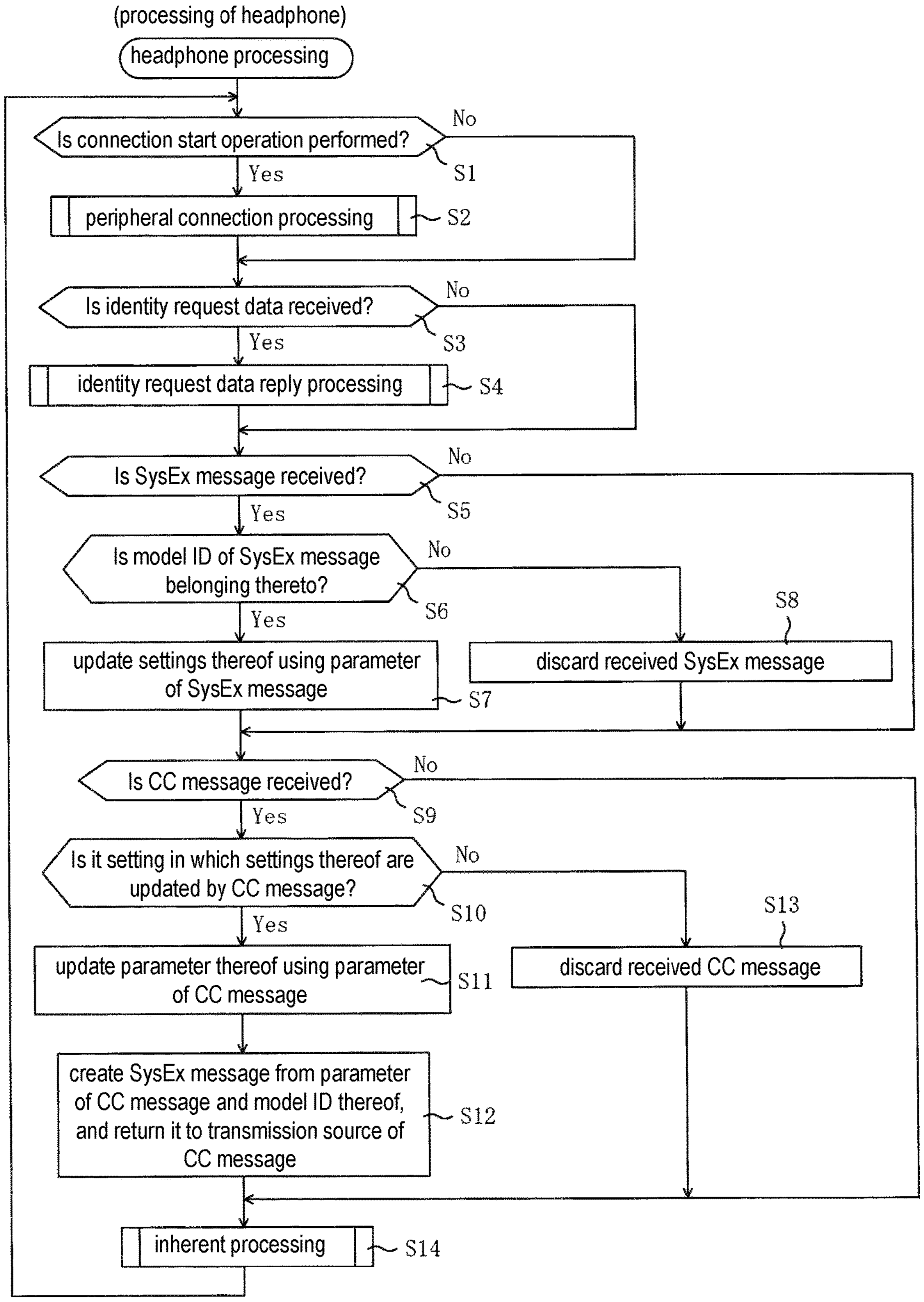
FIG. 9 is a flowchart of headphone processing.

The CPU 31 is an arithmetic operation device configured to control the respective parts connected by the bus line 34. The flash ROM 32 is a rewritable non-volatile storage device in which a program executed by the CPU 31, fixed value data, or the like, is stored, and in which the control program 32*a* and model ID data 32*b* in which the model ID of the headphone 30 is stored are stored. When the control program 32*a* is executed by the CPU 31, the headphone processing of FIG. 9 is executed. The RAM 33 is a memory configured to rewritably store various work data, flags, or the like when the CPU 31 executes the program.

The music reception device 36 is a device configured to receive a musical performance signal from the music transmission device Gt through wireless communication. The amplifier 39 is a device configured to amplify the musical performance sound created by the CPU 31. The speakers R and L are connected to the amplifier 39, and the musical performance sound amplified by the amplifier 39 is output to the speakers R and L. The gyrosensor 41 is a sensor configured to detect an angular speed, and upward, downward, forward, rearward, leftward and rightward movements, inclinations and rotations of the head of the user H who wears the headphone 30 are detected.

The headphone 30 is configured such that a mixed sound of the musical performance sound ("first music") based on the musical performance signal input from the electric guitar G via the music reception device 36 and the music ("second music") input from the portable terminal 50 or the like via the wireless communication device 40 can be output.

Further, in the mixed sound, at least one of the first music and the second music is configured such that a virtual position at which the music is output can be changed according to the movement or inclination of the head of the user H detected by the gyrosensor 41. For example, the second music is used as the drum sound, a virtual position at which the drum sound is output is set behind the user H who plays the electric guitar G, and thus, even when an inclination of the head of the user H who wears the headphone 30 and plays the electric guitar G is changed, the user H sounds like the drum sound is always output from behind.

Next, an electric configuration of the pedal device 1 of the control system S will be described. The pedal device 1 has the CPU 10, the flash ROM 11 and the RAM 12, which are connected to an input/output port 14 via a bus line 13. The pedal switch 15, the operator 16 and the LED 17, and a wireless communication device 22 configured to wirelessly communicate with the headphone 30 and the portable terminal 50 are further connected to the input/output port 14.

The CPU 10 is an arithmetic operation device configured to control the respective parts connected by the bus line 13. The flash ROM 11 is a rewritable non-volatile storage device in which a program executed by the CPU 10, fixed value data, or the like, is stored, and in which a control program 11*a* and model ID data 11*b* in which the model ID of the headphone 30 is stored are stored. When the control program 11*a* is executed by the CPU 10, pedal processing of FIG. 11(*a*) is executed.

The RAM 12 is a memory configured to rewritably store various work data, flags, or the like, when the CPU 10 executes the program, in which a transmission data memory 12*a* configured to store the SysEx message received from the headphone 30 or the portable terminal 50 and a transmission destination thereof, and a musical performance data memory 12*b* configured to store a CC message created based on the pedal switch 15 are provided.

Next, an electric configuration of the portable terminal 50 of the control system S will be described. The portable terminal 50 has a CPU 51, a flash ROM 52 and a RAM 53, which are connected to an input/output port 55 via a bus line 54. A wireless communication device 58 configured to wirelessly communicate with the pedal device 1, the touch panel 56 to which an instruction from the user H is input, and the LCD 57 are further connected to the input/output port 55.

Figure 13:
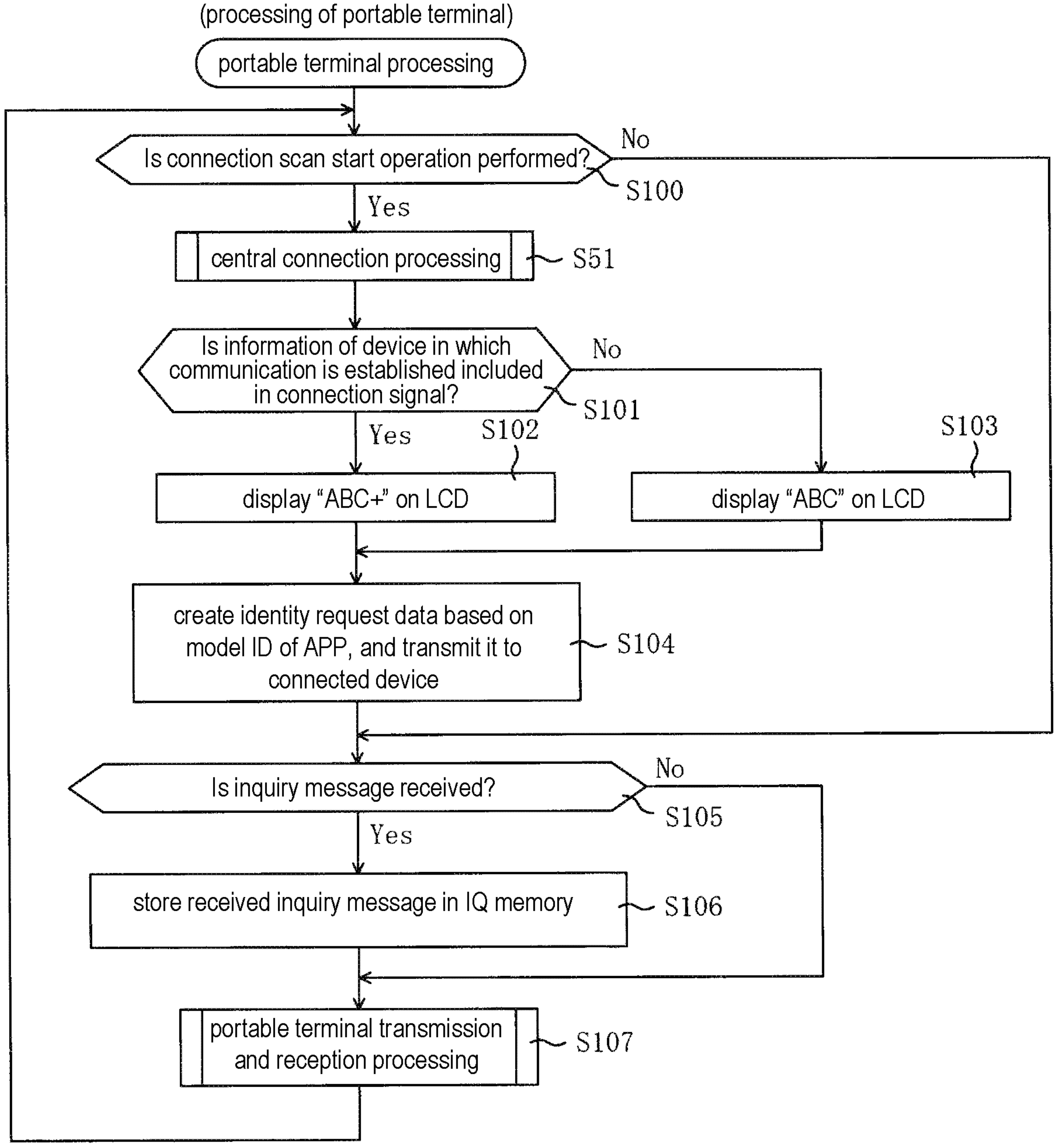
FIG. 13 is a flowchart of portable terminal processing.

The CPU 51 is an arithmetic operation device configured to control the respective parts connected by the bus line 54. The flash ROM 52 is a rewritable non-volatile storage device configured to store a program executed by the CPU 51, fixed value data, or the like, and in which a control program 52*a* is stored. When the control program 52*a* is executed by the CPU 51, portable terminal processing of FIG. 13 is executed. More specifically, the control program 52*a* includes an app using the pedal device 1 as the control object and an app using the headphone 30 as the control object, and portable terminal processing according to the app started according to the operation of the touch panel 56 is executed. Details of the portable terminal processing will be described below with reference to FIG. 13.

The RAM 53 is a memory configured to rewritably store various work data, flags, or the like, when the CPU 51 executes the program, and in which an IQ memory 53*a* configured to store the inquiry message IQ is provided.

Next, processing of the control system S will be described with reference to FIGS. 9 to 13. First, processing executed by the CPU 31 of the headphone 30 will be described. FIG. 9 is a flowchart of headphone processing. The headphone processing is processing executed when the power source of the headphone 30 is turned on.

The headphone processing first checks whether a connection start operation is performed to start connection of another communication device such as the pedal device 1 or the like from the user H to the operator 37 (S1). Specifically, when the operator 37 is pressed and elongated, it is determined that the connection start operation is performed. In the processing of S1, when the connection start operation is performed (S1: Yes), peripheral connection processing (S2) is executed. Here, the peripheral connection processing will be described with reference to FIG. 10(*a*).

Figure 10A:
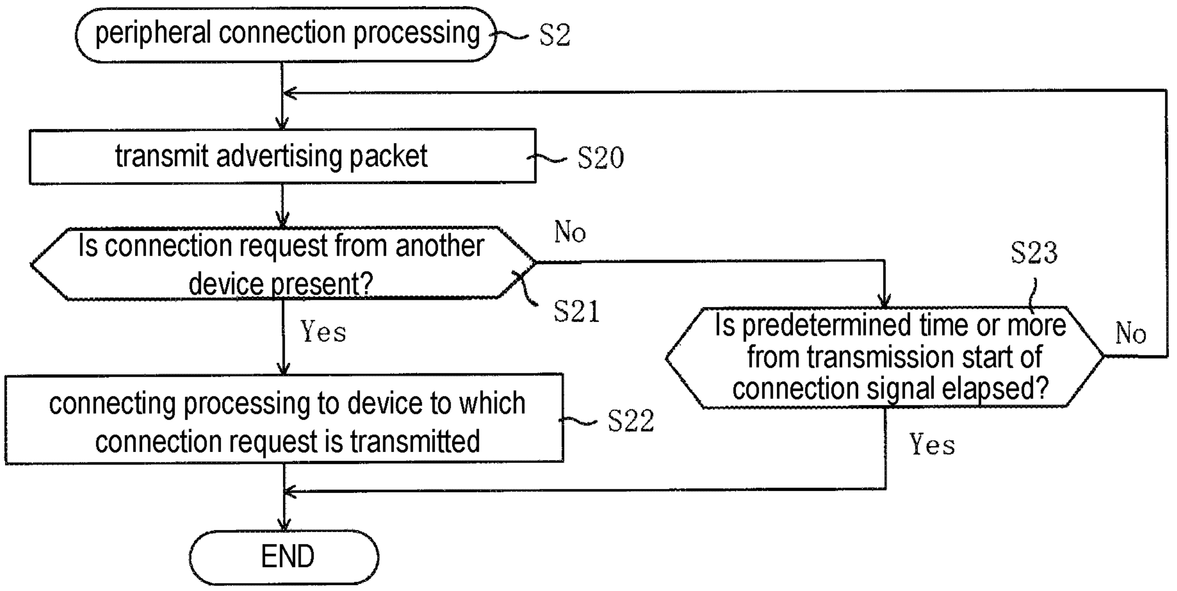
FIG. 10(*a*) is a flowchart of peripheral connection processing, and FIG. 10(*b*) is a flowchart of identity request reply processing.
Figure 10B:
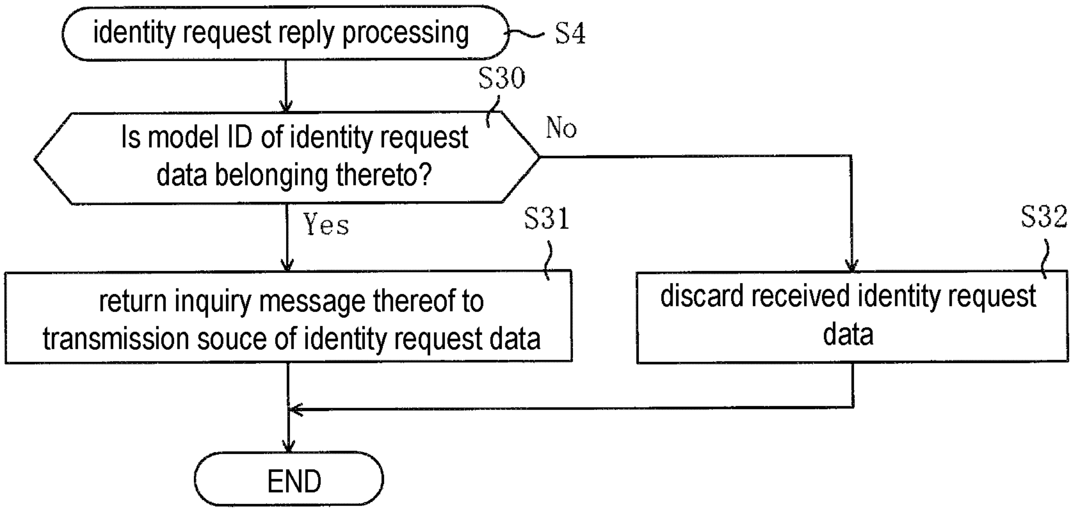

FIG. 10(*a*) is a flowchart of the peripheral connection processing. The peripheral connection processing is performed by the CPU 31 of the headphone 30, and equivalent processing is also performed by the CPU 10 of the pedal device 1.

In the peripheral connection processing, first, in FIG. 3, the advertising packet AD is transmitted to another communication device (S20). Transmission of the advertising packet AD to the other communication device is performed using the wireless communication device 40 in the case of the headphone 30, and performed using the wireless communication device 22 in the case of the pedal device 1. Hereinafter, communication with the other communication device in the peripheral connection processing is performed using the wireless communication device 40 in the case of the headphone 30, and performed using the wireless communication device 22 in the case of the pedal device 1.

After processing of S20, it is checked whether the connection request from the other communication device is received according to the advertising packet AD transmitted in the processing of S20 (S21). In the processing of S21, when the connection request is received (S21: Yes), connection processing to the other communication device to which the connection request is transmitted (i.e., the pedal device 1 or the portable terminal 50) is performed (S22).

Meanwhile, in the processing of S21, when the connection request is not received (S21: No), it is checked whether a predetermined time or more elapses from the transmission start of the advertising packet AD in the processing of S20 (S23). In the processing of S23, when the predetermined time or more does not elapse from the transmission start of the advertising packet AD (S23: No), the processing after S20 is executed again. After the processing of S22 or in the processing of S23, when the predetermined time or more elapses from the transmission start of the advertising packet AD (S23: Yes), the peripheral connection processing is terminated.

Returning to FIG. 9, in the processing of S1, when the connection start operation is not performed (S1: No) or after the peripheral connection processing of S2, it is checked whether the identity request data SR is received in FIG. 4 (S3). In the processing of S3, when the identity request data SR is received (S3: Yes), the identity request reply processing is executed (S4). Here, the identity request reply processing will be described with reference to FIG. 10(*b*).

FIG. 10(*b*) is a flowchart of the identity request reply processing. The identity request reply processing is executed by the CPU 31 of the headphone 30, and equivalent processing is also executed by the CPU 10 of the pedal device 1.

In the identity request reply processing, first, it is checked whether the model ID of the received the identity request data SR belongs to the device itself (S30). Specifically, in the case of the model ID included in the identity request data SR, the model ID of the device itself, i.e., the headphone 30, the model ID of the model ID data 11*b* is compared with the model ID of the model ID data 32*b* or the pedal device 1, and it is checked whether the IDs coincide with each other.

In the processing of S30, when the model ID of the identity request data SR belongs to the device itself (S30: Yes), the inquiry message IQ of the device itself is created (see FIG. 4), and the created inquiry message IQ is transmitted (returned) to the transmission source of the identity request data SR, i.e., the pedal device 1 or the portable terminal 50 (S31). The transmission is performed using the wireless communication device 40 in the case of the headphone 30 and performed using the wireless communication device 22 in the case of the pedal device 1.

Meanwhile, in the processing of S30, when the model ID of the identity request data SR does not belong to the device itself (S30: No), the received identity request data SR is discarded (S32). After the processing of S31 and S32, the identity request reply processing is terminated.

Returning to FIG. 9, in the processing of S3, when the identity request data SR is not received or after the processing of S4, it is checked whether the SysEx message is received (S5). In the processing of S5, when the SysEx message is received (S5: Yes), it is checked whether the model ID of the control instruction RS in the SysEx message coincides with the model ID of the model ID data 32*b* (S6).

In the processing of S6, when the model ID of the control instruction RS in the SysEx message coincides with the model ID of the model ID data 32*b* (S6: Yes), the settings thereof are updated using the parameters included in the control instruction RS of the SysEx message (S7). Meanwhile, when the model ID of the control instruction RS in the SysEx message does not coincide with the model ID of the model ID data 32*b* (S6: No), the received SysEx message is discarded (S8).

In the processing of S5, when the SysEx message is not received (S5: No) or after the processing of S7 and S8, it is checked whether the CC message (see FIG. 6(*a*)) is received in FIG. 6 (S9). In the processing of S9, when the CC message is received (S9: Yes), it is checked whether the headphone 30 is in a mode in which the settings thereof are updated by the received CC message (S10).

In the processing of S10, when it is the mode in which the settings thereof are updated by the received CC message (S10: Yes), the settings thereof are updated using the parameters of the update instruction CC included in the CC message (S11).

After the processing of S11, the reply instruction PS (see FIG. 6(*a*)) is created from the parameter of the update instruction CC of the CC message received in the processing of S9 and the model ID of the model ID data 32*b*, and the SysEx message to which the reply instruction PS is assembled is transmitted (returned) to the transmission source of the CC message, i.e., the pedal device 1 (S12). Meanwhile, in the processing of S10, when it is not in the mode in which the settings thereof are updated by the received CC message (S10: No), the received CC message is discarded (S13).

In the processing of S9, when the CC message is not received (S9: No), after the processing of S12 and S13, inherent processing (S14) is executed. The inherent processing is another processing performed in the headphone 30, and for example, the musical performance sound based on the musical performance signal input from the electric guitar G via the music reception device 36 or the musical performance sound input from the portable terminal 50 via the pedal device 1 is output to the speakers R and L via the amplifier 39. After the inherent processing of S14, the processing after S1 is repeated.

Figure 11A:
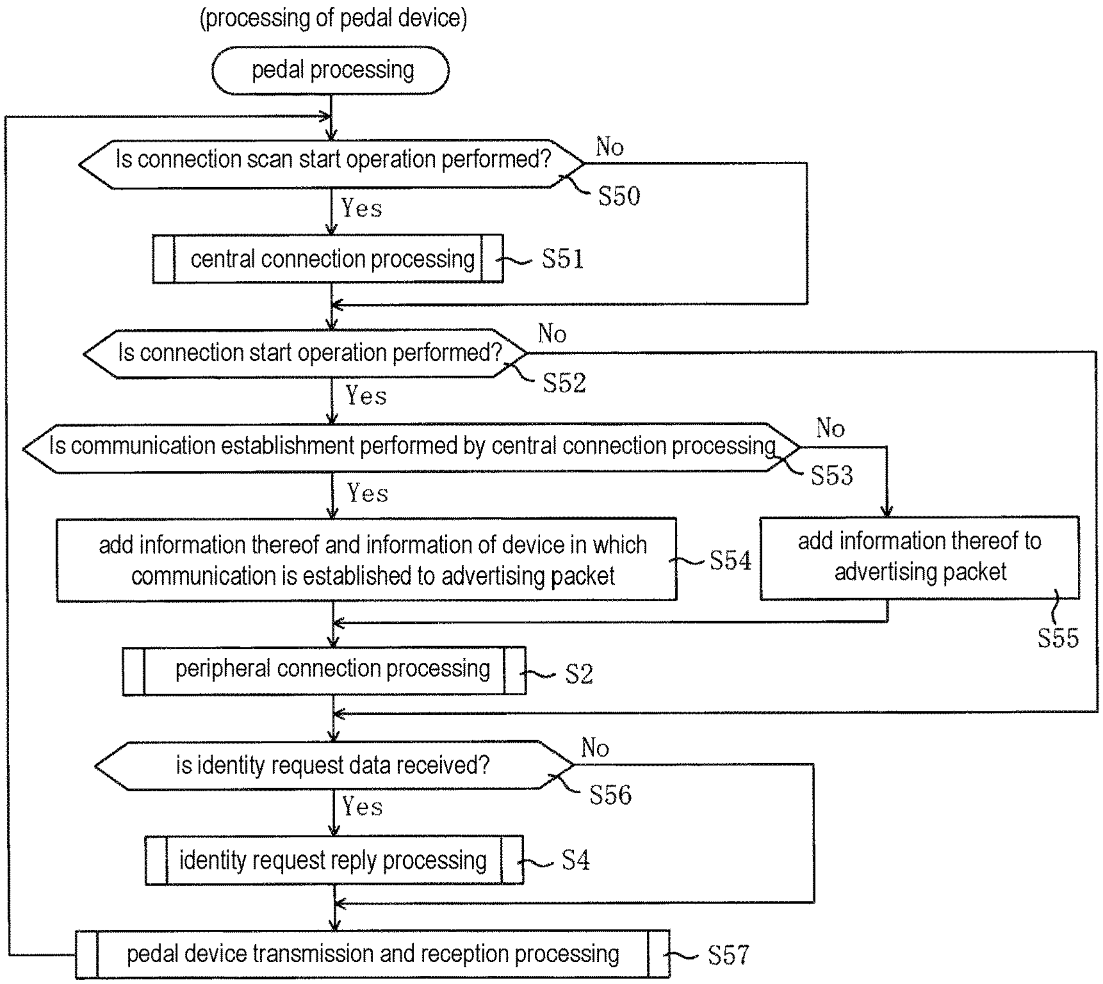
FIG. 11(*a*) is a flowchart of pedal processing, and FIG. 11(*b*) is a flowchart of central connection processing.
Figure 11B:
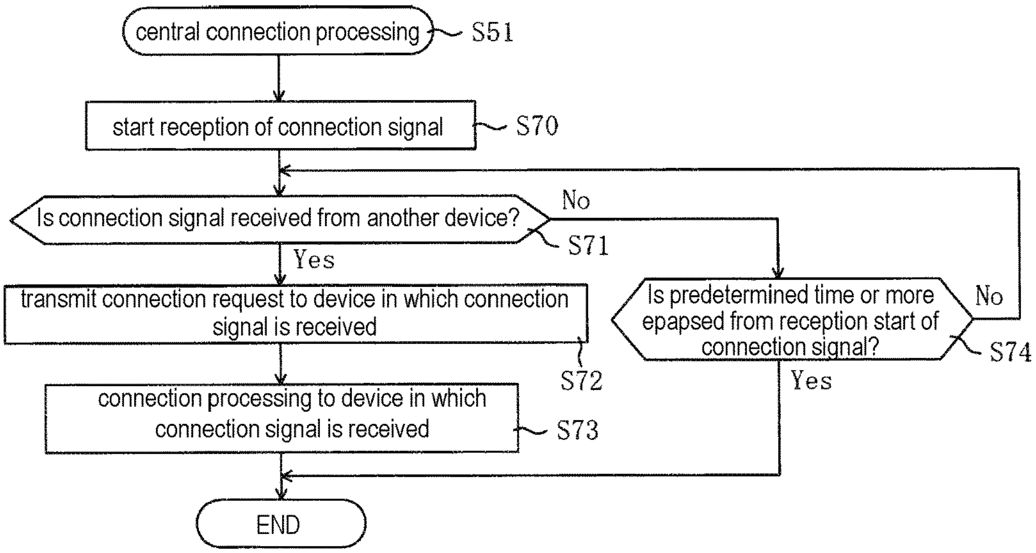

Next, the processing executed by the CPU 10 of the pedal device 1 will be described. FIG. 11(*a*) is a flowchart of pedal processing. The pedal processing is processing executed when the power source of the pedal device 1 is turned on.

In the pedal processing, first, it is checked whether a connection scan start operation of instructing start of reception of the advertising packet AD from the other communication device (specifically, the headphone 30) is performed (S50). Specifically, as described in FIG. 3(*a*), when it is transited to the scan mode by double-clicking the operator 16 by the user H until the lighting color of the LED 17 is white (i.e., the central function) and then single-clicking the operator 16 by the user H, it is determined that the connection scan start operation is performed. In the processing of S50, when the connection scan start operation is performed (S50: Yes), central connection processing (S51) is executed. Here, the central connection processing will be described with reference to FIG. 11(*b*).

FIG. 11(*b*) is a flowchart of the central connection processing. The central connection processing is executed by the CPU 10 of the pedal device 1, and equivalent processing is also executed by the CPU 51 of the portable terminal 50. In the central connection processing, first, reception of the advertising packet AD is started (S70). Reception of the advertising packet AD is performed using the wireless communication device 22 in the case of the pedal device 1 and performed using the wireless communication device 58 in the case of the portable terminal 50. Hereinafter, communication with the other communication device in the central connection processing is performed using the wireless communication device 22 in the case of the pedal device 1 and performed using the wireless communication device 58 in the case of the portable terminal 50.

After the processing of S70, it is checked whether the advertising packet AD is received from the other communication device (S71). In the processing of S71, when the advertising packet AD is received (S71: Yes), a connection request is transmitted to the communication device to which the advertising packet AD is received (S72), and the connection processing to the communication device is performed (S73).

In the processing of S71, when the advertising packet AD is not received (S71: No), it is checked whether a predetermined time or more elapses from reception start of the advertising packet AD in the processing of S70 (S74). In the processing of S74, when the predetermined time or more does not elapse from the reception start of the advertising packet AD (S74: No), the processing after S70 is repeated.

Meanwhile, in the processing of S74, when the predetermined time or more elapses from the reception start of the advertising packet AD (S74: Yes) or after the processing of S73, the central connection processing is terminated. The first communication w1 with the headphone 30 and the pedal device 1 or the second communication w2 with the pedal device 1 and the portable terminal 50 is established by such central connection processing and the above-mentioned peripheral connection processing.

Returning to FIG. 11(*a*), in the processing of S50, when the connection scan start operation is not performed (S50: No) or after the central connection processing of S51, it is checked whether the connection start operation is performed from the operator 16 (S52). Specifically, as described above in FIG. 3(*b*), when it is transited to the advertising mode by double-clicking the operator 16 by the user H until the lighting color of the LED 17 is blue (i.e., the peripheral function) and single-clicking the operator 16 by the user H, it is determined that the connection start operation is performed. In the processing of S52, when the connection start operation is performed (S52: Yes), it is confirmed whether communication with the other communication device is established in the central connection processing of S51 (S53).

In the processing of S53, when communication with the other communication device is established in the central connection processing (S53: Yes), the information thereof and the information of the communication device in which communication is established (see FIG. 3(*b*)) are added to advertising packet AD (S54). In the processing of S53, when communication with the other communication device is established in the central connection processing (S53: No), the information thereof is added to the advertising packet AD (S55). After the processing of S54 and S55, the peripheral connection processing of S2 is executed.

In the processing of S52, when the connection start operation is not performed (S52: No) or after the processing of S2, it is confirmed whether the identity request data SR (see FIG. 4) is received (S56). In the processing of S55, when the identity request data SR is received (S56: Yes), the identity request reply processing (S4) is executed. In the processing of S56, when the identity request data SR is not received (S56: No), the processing of S4 is skipped. After the processing of S4 and S56, pedal device reception and transmission processing (S57) is executed, and the processing after S50 is repeated. Here, the pedal device reception and transmission processing will be described with reference to FIG. 12.

Figure 12:
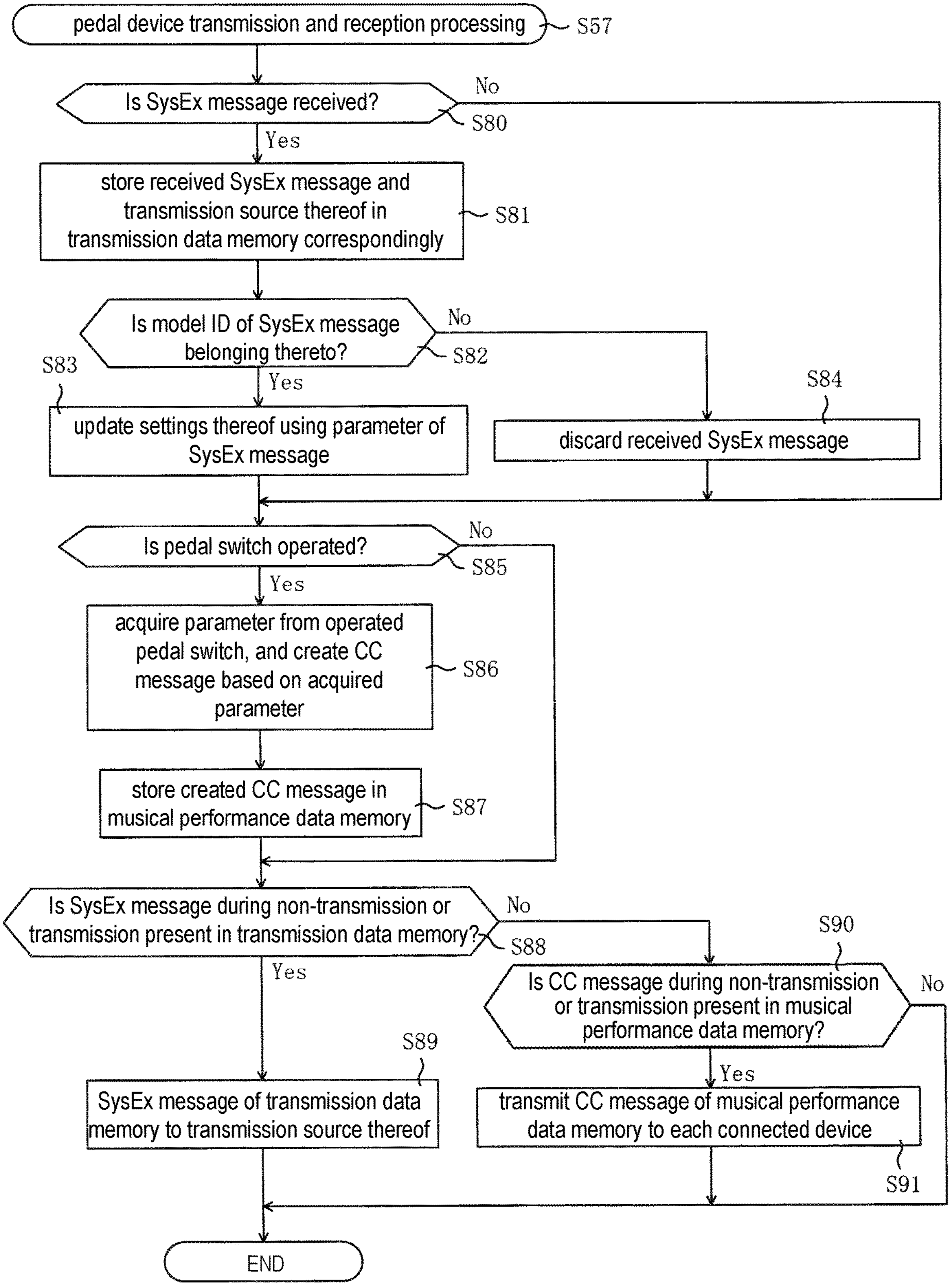
FIG. 12 is a flowchart of pedal device reception and transmission processing.

FIG. 12 is a flowchart of the pedal device reception and transmission processing. In the pedal device reception and transmission processing, first, it is checked whether the SysEx message is received (S80). In the processing of S80, when the SysEx message is received (S80: Yes), the received SysEx message is stored in the transmission source of the SysEx message and the transmission data memory 12*a* (S81). The transmission source of the SysEx message is specifically set to the headphone 30 when the SysEx message is received from the portable terminal 50 and set to the portable terminal 50 when the SysEx message is received from the headphone 30.

After the processing of S81, it is checked whether the model ID of the control instruction RS in the SysEx message coincides with the model ID of the model ID data 11*b* (S82). In the processing of S82, when the model ID of the control instruction RS in the SysEx message coincides with the model ID of the model ID data 11*b* (S82: Yes), the settings thereof are updated using the parameters included in the control instruction RS of the SysEx message (S83). Accordingly, for example, when the control instruction RS of the SysEx message received from the portable terminal 50 changes the sound effect controlled by the pedal device 1 to "delay," after that, the sound effect that controls the effect size is changed to "delay" by the pedal switch 15 of the pedal device 1.

Meanwhile, When the model ID of the control instruction RS in the SysEx message does not coincide with the model ID of the model ID data 11*b* (S82: No), the received SysEx message is discarded (S84).

In the processing of S80, when the SysEx message is not received (S80), after the processing of S83 and S84, it is checked whether the pedal switch 15 is operated (S85). In the processing of S85, when the pedal switch 15 is operated (S85: Yes), a parameter according to the angle is acquired from the pedal switch 15 and the update instruction CC based on the acquired parameter is created. The CC message including the created update instruction CC is created (S86). After the processing of S86, the created CC message is stored in the musical performance data memory 12*b* (S87).

In the processing of S85, when the pedal switch 15 is not operated (S85: No) or after the processing of S87, it is checked whether the SysEx message during non-transmission or transmission is present in the transmission data memory 12*a* (S88). In the processing of S88, where the SysEx message during non-transmission or transmission is present in the transmission data memory 12*a* (S88: Yes), the SysEx message of the transmission data memory 12*a* is transmitted to the transmission source stored in the transmission data memory 12*a* (S89).

Meanwhile, in the processing of S88, when the SysEx message during non-transmission or transmission is not present in the transmission data memory 12*a* (S88: No), it is checked whether the CC message during non-transmission or transmission is present in the musical performance data memory 12*b* (S90).

In the processing of S90, when the CC message during non-transmission or transmission is present in the musical performance data memory 12*b* (S90: Yes), the CC message of the musical performance data memory 12*b* is transmitted to each communication device connected to the pedal device 1 (S91). Meanwhile, in the processing of S90, when the CC message during non-transmission or transmission is not present in the musical performance data memory 12*b* (S90: No), the processing of S91 is skipped.

That is, in a state in which the SysEx message is received from the portable terminal 50 or the headphone 30 and the received SysEx message is in non-transmission or transmission, even when the pedal switch 15 is operated and the CC message is created, after completion of transmission of the SysEx message received in advance, transmission of the CC message created after that is started. As the SysEx message and the CC message received in this way are serialized for transmission, the SysEx message and the CC message can be transmitted to the same communication route (the first communication w1 or the second communication w2).

After the processing of S89, S90 and S91, the pedal device reception and transmission processing is terminated.

Next, the processing executed by the CPU 51 of the portable terminal 50 will be described. FIG. 13 is a flowchart of the portable terminal processing. The portable terminal processing is processing executed when a starting instruction of an app using the pedal device 1 as the control object or an app using the headphone 30 as the control object is input with the operation of the user H via the touch panel 56.

In the portable terminal processing, first, it is checked from the touch panel 56 whether a connection scan start operation that instructs to start reception of the advertising packet AD from the other communication device (specifically, the pedal device 1) is performed (S100). Specifically, in the portable terminal 50, after starting of the app using the pedal device 1 as the control object and the app using the headphone 30 as the control object, when a button (not shown) that starts connection scan displayed on the LCD 57 is displayed and the button is selected via the touch panel 56, it is determined that the connection scan start operation is performed. In the processing of S100, when the connection scan start operation is performed (S100: Yes), the central connection processing (S51) is executed.

After the central connection processing of S51, it is checked whether information of the communication device in which communication is established is included in the advertising packet AD received in the central connection processing (S101). In the processing of S105, when the information of the communication device in which communication is established is included in the advertising packet AD (S101: Yes), "ABC+" is displayed on the LCD 57 (S102). Meanwhile, in the processing of S105, when the information of the communication device in which communication is established is not included in the advertising packet AD (S101: No), "ABC" is displayed on the LCD 57 (S103).

After the processing of S102 and S103, the identity request data SR is created based on the model ID of the control object (i.e., the pedal device 1 or the headphone 30) of the app that is starting, and transmitted to the connected communication device (specifically, the pedal device 1) (S104).

In the processing of S100, when the connection scan start operation is not performed (S100: No) or after the processing of S104, it is checked whether the inquiry message IQ is received (S105). In the processing of S105, when the inquiry message IQ is received (S105: Yes), the received inquiry message IQ is stored in the IQ memory 53*a* (S106). Meanwhile, in the processing of S105, when the inquiry message IQ is not received (S105: No), the processing of S106 is skipped.

After the processing of S105 and S106, portable terminal reception and transmission processing (S107) is executed, and the processing after S100 is repeated. Here, the portable terminal reception and transmission processing will be described with reference to FIG. 14.

Figure 14:
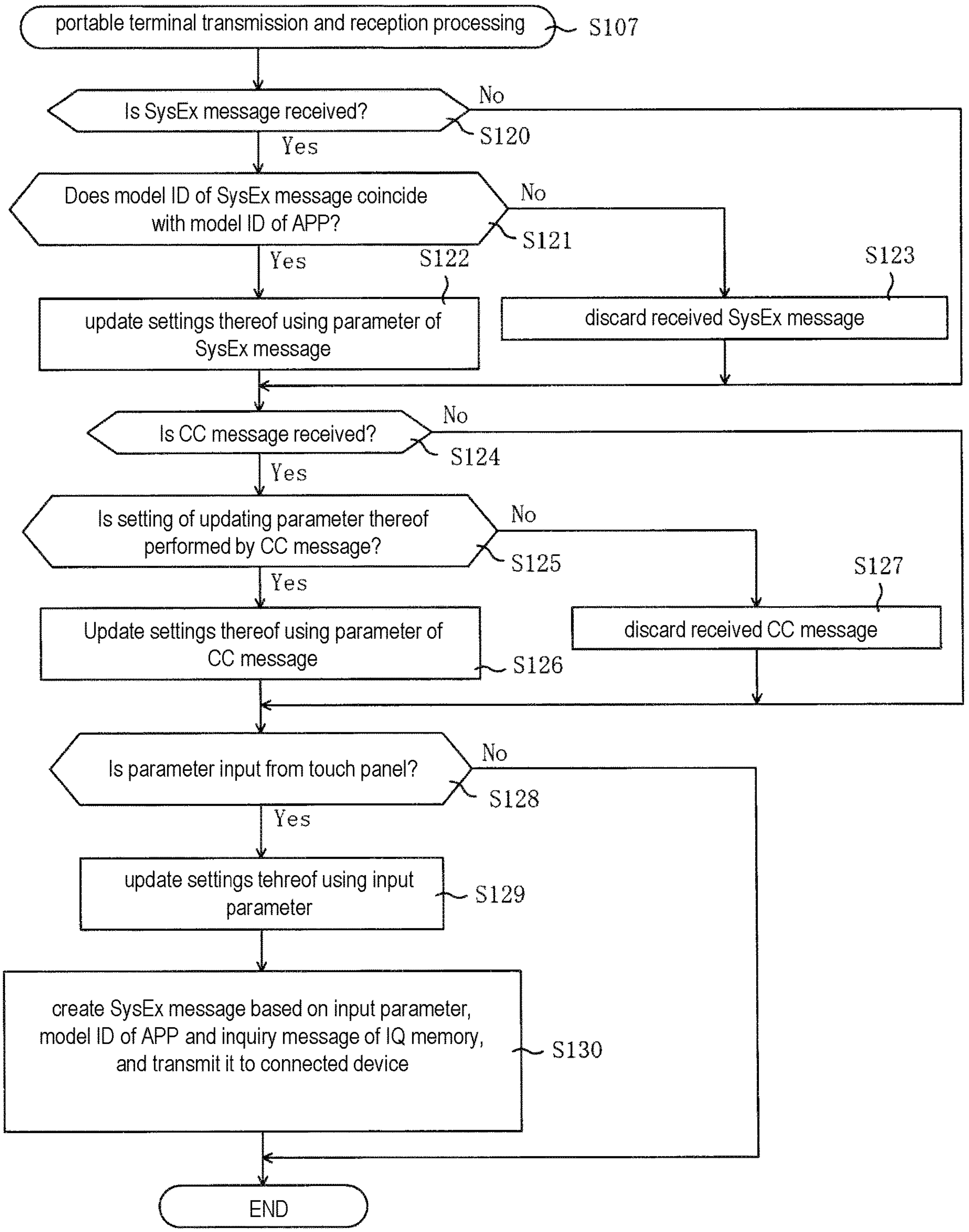
FIG. 14 is a flowchart of portable terminal reception and transmission processing.

FIG. 14 is a flowchart of the portable terminal reception and transmission processing. In the portable terminal reception and transmission processing, first, it is checked whether the SysEx message is received (S120). In the processing of S120, when the SysEx message is received (S120: Yes), it is checked whether the model ID of the control instruction RS in the SysEx message coincides with the model ID of the control object of the app that is starting (S121).

In the processing of S121, when the model ID of the control instruction RS in the SysEx message coincides with the model ID of the control object of the app that is starting (S121: Yes), the settings thereof are updated using the parameter included in the control instruction RS of the SysEx message (S122). Meanwhile, when the model ID of the control instruction RS in the SysEx message does not coincide with the model ID of the control object of the app that is starting (S121: No), the received SysEx message is discarded (S123).

In the processing of S120, when the SysEx message is not received (S120: No) or after the processing of S122 and S123, it is checked whether the CC message is received (S124). In the processing of S124, when the CC message is received (S124: Yes), it is checked whether it is in a mode in which the settings thereof is updated by the CC message (S125).

In the processing of S125, when it is in a mode in which the settings thereof are updated by the CC message (S125: Yes), the settings thereof are updated using the parameter of the update instruction CC included in the CC message (S126).

Meanwhile, in the processing of S125, when it is not the mode in which the settings thereof are updated by the received CC message (S125: No), the received CC message is discarded (S127).

In the processing of S124, when the CC message is received (S124: Yes) or after the processing of S126 and S127, it is checked whether the parameter (for example, a type of the sound volume in FIG. 5(*a*) or the sound effect in FIG. 5(*b*)) is input from the user H via the touch panel 56 (S128). In the processing of S128, when the parameter is input (S128: Yes), the settings thereof are updated using the input parameter (S129).

After the processing of S129, the control instruction RS is created from the input parameter, the model ID of the control object of the app that is starting, and the inquiry message IQ of the IQ memory 53*a*. The SysEx message including the created control instruction RS is created and transmitted to the connected communication device (specifically, the pedal device 1) (S130). Accordingly, the control instruction RS from the portable terminal 50 is transmitted to the pedal device 1 and the headphone 30.

In the processing of S128, when the parameter is not input from the touch panel 56 (S128: No) or after the processing of S130, the portable terminal reception and transmission processing is terminated.

Hereinabove, while the present invention has been described based on the embodiment, it can be easily inferred that various improvements and modifications are possible.

Figure 15:
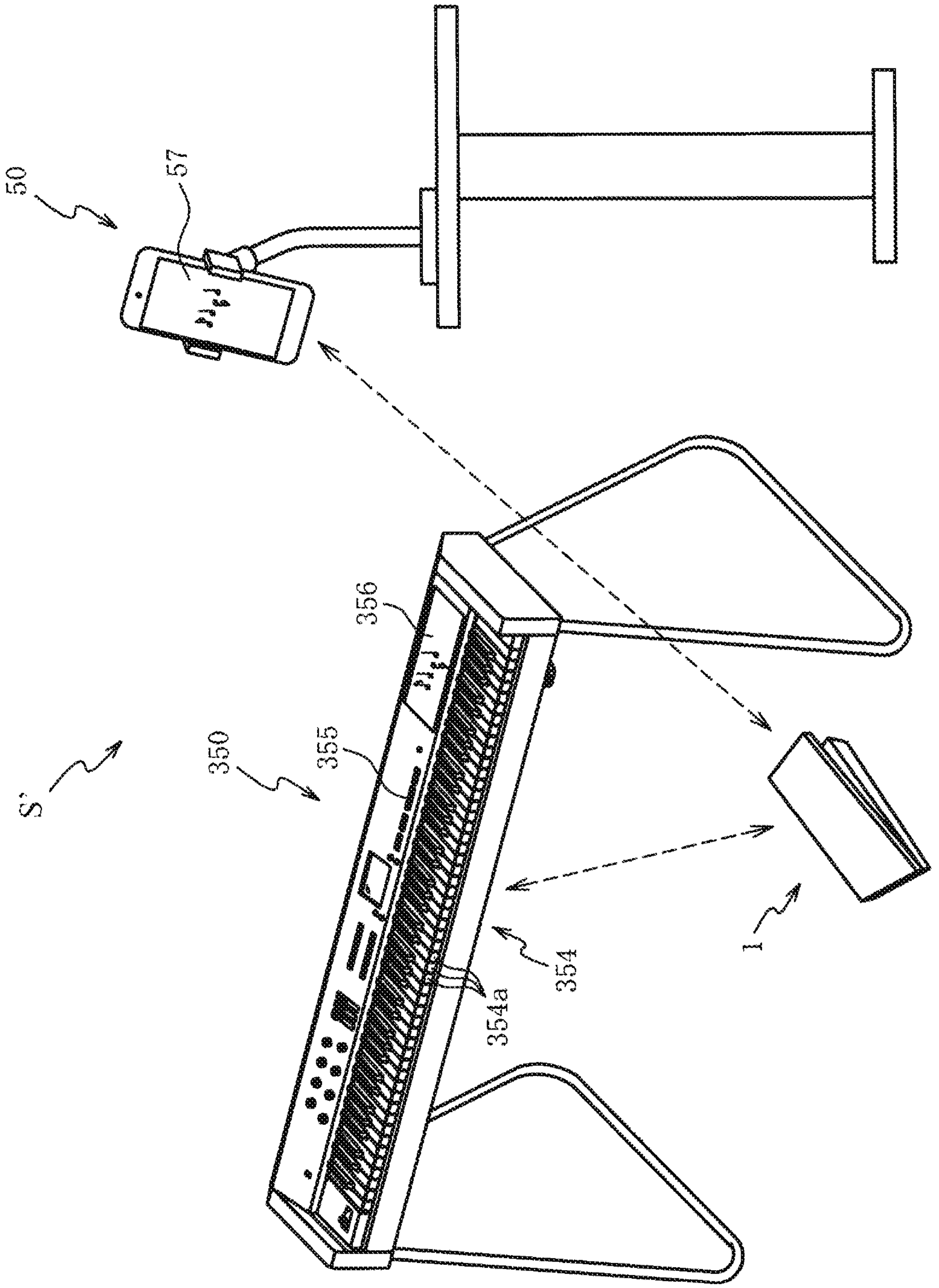
FIG. 15 is a view schematically showing a control system according to a variant.

In the embodiment, while the headphone 30 or the effecters 300 and 310 (see FIG. 3(*a*)) has been exemplified as the device connected to the pedal device 1 and the portable terminal 50, there is no limitation thereto. The electronic musical instrument other than the headphone 30 or the effecters 300 and 310 may be connected to, for example, a synthesizer 350 shown in FIG. 15. That is, in a control system S' shown in FIG. 15, the first communication w1 is established by the synthesizer 350 and the pedal device 1.

A musical score is displayed on the LCD 57 of the portable terminal 50 in the variant. A position of the displayed musical score is changed with the operation of the touch panel 56. Here, the position of the musical score displayed on the LCD 57 is also changed with the operation of the pedal switch 15 of the pedal device 1.

Mainly, a keyboard 354, a setting key 355 configured to input various settings, and a musical score LCD 356 are disposed in the synthesizer 350 in the variant. A plurality of keys 354*a* are disposed on the keyboard 354, which is an input device configured to acquire musical performance information according to musical performance of the user H. MIDI standard musical performance information according to key pushing/releasing operations of the keys 354*a* by the user H is output to a CPU 351 (see FIG. 16).

The musical score LCD 356 is a display device configured to display the same musical score as the musical score displayed on the LCD 57 of the portable terminal 50. The musical score displayed on the musical score LCD 356 and the display position thereof are transmitted from the portable terminal 50 and the pedal device 1.

That is, when the display position of the musical score is changed by the portable terminal 50 or when the display position of the musical score is changed by the pedal switch 15 of the pedal device 1, the same musical score as the musical score displayed on the LCD 57 of the portable terminal 50 is displayed on the musical score LCD 356. Accordingly, the display position of the musical score of the synthesizer 350 that is one can be changed from the portable terminal 50 and the pedal device 1 that are two. In particular, since the pedal switch 15 of the pedal device 1 is operated by the stepping of the user H, the user H can change the display position of the musical score of the musical score LCD 356 without releasing his/her hand from the keyboard 354.

Figure 16:
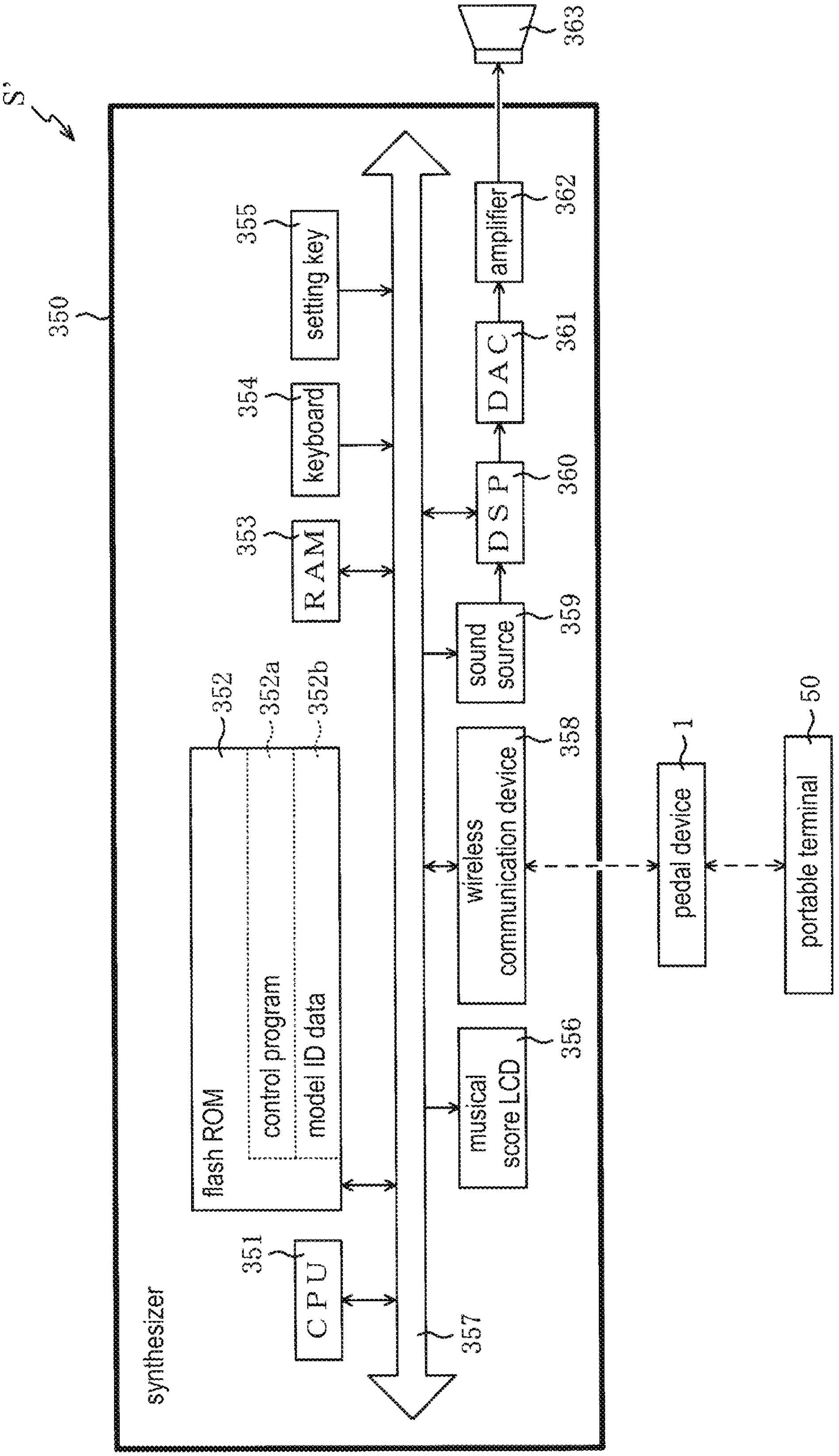
FIG. 16 is a block diagram showing an electric configuration of a control system according to a variant.

Next, an electric configuration of the control system S' in the variant will be described with reference to FIG. 16. FIG. 16 is a block diagram showing the electric configuration of the control system S'. The synthesizer 350 of the control system S' has the CPU 351, a flash ROM 352 and a RAM 353, which are connected via a bus line 357. The keyboard 354, the setting key 355 and the musical score LCD 356, a wireless communication device 358 configured to wirelessly communicate with the pedal device 1, a sound source 359, and a digital signal processor 360 (hereinafter, referred to as "the DSP 360") are further connected to the bus line 357. The DSP 360 is also connected to the sound source 359.

The CPU 351 is an arithmetic operation device configured to control the respective parts connected by the bus line 357. The flash ROM 352 is a rewritable non-volatile storage device in which a program executed by the CPU 351, fixed value data, or the like, are stored, and model ID data 352*b* in which a control program 352*a* and a model ID are stored is stored therein. When the control program 352*a* is executed by the CPU 351, the same processing as the headphone processing in FIG. 9 is executed. Further, in inherent processing (S14) in the headphone processing, while inherent processing of the synthesizer 350 is executed, details will be described below with reference to FIG. 17.

The RAM 353 is a memory configured to rewritably store various work data, flags, or the like, when the CPU 351 executes the program. The sound source 359 is a device configured to output waveform data according to the musical performance information output from the CPU 351. The DSP 360 is an arithmetic operation device configured to perform arithmetic operation processing of the waveform data output from the sound source 359. A digital-analog converter (DAC) 361 is connected to the DSP 360, an amplifier 362 is connected to the DAC 361, and speakers 363 are connected to the amplifier 362.

Next, processing executed by the CPU 351 of the synthesizer 350 will be described. In the synthesizer 350, processing related to communication with the pedal device 1 and the portable terminal 50 is substantially the same as the processing of the headphone 30 except the connection start operation (S1) and the inherent processing (S14) of the headphone processing in FIG. 9 in the embodiment. In the synthesizer 350, by long pressing the predetermined setting key 355, it is determined that the connection start operation in the processing of S1 in the headphone processing is performed.

Figure 17:
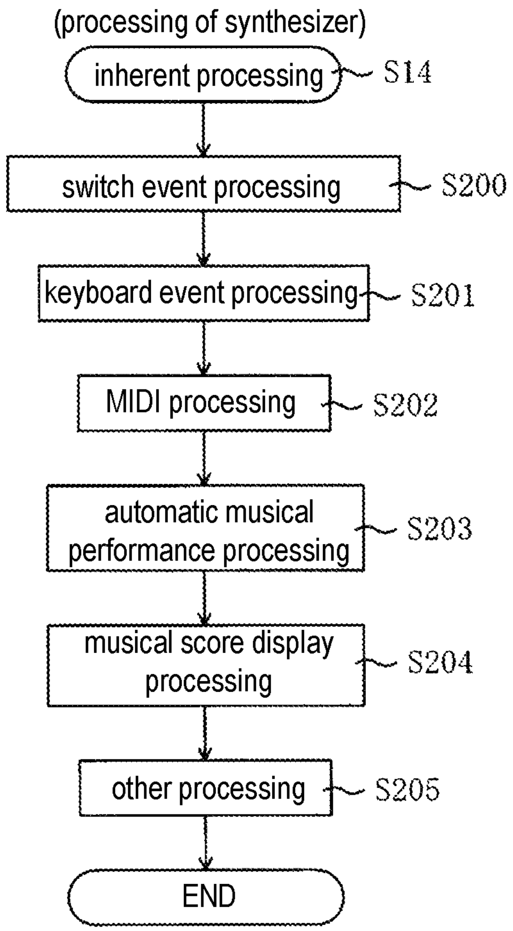
FIG. 17 is a flowchart of inherent processing of a synthesizer according to a variant.

Next, the inherent processing (S14) of the synthesizer 350 will be described. FIG. 17 is a flowchart of the inherent processing of the synthesizer 350 according to the variant. In the inherent processing of the synthesizer 350, first, switch event processing is performed (S200). In the switch event processing, it is checked whether the setting key 355 is operated, and when the setting key 355 is operated, processing according to the setting key 355 is performed.

After the processing of S200, keyboard event processing (S201) is performed. In the keyboard event processing, in the keyboard 354, which the keys 354*a* is pressed or released is detected. After the processing of S201, MIDI processing is performed (S202). In the MIDI processing, output of the musical performance sound and stoppage of the output are performed according to the operations of the keys 354*a* detected in the processing of S201, and the musical score displayed on the musical score LCD 356 or the display position of the musical score is acquired from the update instruction CC from the pedal device 1 or the parameter included in the control instruction RS of the portable terminal 50.

After the processing of S202, automatic musical performance processing (S203) is performed. In the automatic musical performance processing, concert magic musical performance processing, automatic accompaniment processing, demonstration processing, and the like, are performed. After the processing of S203, musical score display processing (S204) is performed. In the musical score display processing, an image of the musical score is created based on the musical score acquired in the MIDI processing and the display position of the musical score, and displayed on the musical score LCD 356. Accordingly, the same musical score as the musical score displayed on the LCD 57 of the portable terminal 50 is displayed on the musical score LCD 356. After the processing of S204, the other processing (S205) related to the synthesizer 350 is performed, and inherent processing is terminated.

Further, in the variant, while the configuration in which the musical score displayed on the LCD 57 of the portable terminal 50 is displayed on the musical score LCD 356 of the synthesizer 350 and the position of the musical score displayed on the musical score LCD 356 is changed with the operations from the pedal device 1 and the portable terminal 50 has been exemplarily described, there is no limitation thereto. For example, in the musical score displayed on the LCD 57 and the musical score LCD 356, a display aspect (for example, a size of color, a musical note, or the like, and marking) of the musical note or the like to be played currently may be changeable, or the musical note or the like that changes a display aspect according to the operations of the portable terminal 50 and the pedal device 1 may be changed (advanced, retracted, or the like). In addition, the sound volume of the musical performance sound output by the synthesizer 350 or a degree or a type of the sound effect added to the musical performance sound may be changed with the operations of the portable terminal 50 and the pedal device 1.

While the pedal device 1 having the pedal switch 15 as the control device has been exemplarily described in the embodiment, there is no limitation thereto. For example, the control device may be a device having a switch configured to switch an ON/OFF state, or a device having "a knob" or a fader that can variably control the output parameter. In addition, a device using the sensor information (for example, a device configured to acquire a variation of an acceleration sensor and control the control object according to the variation) may be a control device, or a device configured to set the other parameters may be a control device.

While the portable terminal 50 configured to execute the control program 52*a* has been exemplarily described as the central communication device configured to transmit the control instruction to the headphone 30 and the pedal device 1 in the embodiment, there is no limitation thereto. For example, by executing the control program 52*a* using the information processing device such as a PC, a tablet terminal, or the like, these may be central communication devices configured to transmit a control instruction to the headphone 30 and the pedal device 1. In addition, the control program 52*a* may be stored in a ROM or the like, and a dedicated device configured to execute only the control program 52*a* may be a central communication device configured to transmit a control instruction to the headphone 30 and the pedal device 1.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pedal device with a pedal switch configured to control an electronic musical instrument in response to an operation of the pedal switch by a user and relay control from a control device to the electronic musical instrument, comprising:

an input unit configured to generate a control instruction in response to the operation of the pedal switch by the user;

a first communication unit configured to wirelessly communicate with the electronic musical instrument;

a second communication unit configured to wirelessly communicate with the control device; and an instruction transmission unit configured to transmit the control instruction generated by the input unit and a second control instruction received from the control device via the second communication unit to the electronic musical instrument via the first communication unit as different instructions.

2. The pedal device according to claim 1, wherein the instruction transmission unit transmits the control instruction generated by the input unit and the second control instruction received from the control device via the second communication unit to the electronic musical instrument via the first communication unit in a state in which the instructions are converted into serial data.

3. The pedal device according to claim 2, comprising a determination unit configured to determine whether the second control instruction received from the control device via the second communication unit is a control instruction to the pedal device.

4. The pedal device according to claim 2, wherein the first communication unit performs wireless communication based on the Bluetooth (registered trademark) Low Energy standard.

5. The pedal device according to claim 2, wherein the control instruction is an instruction using a MIDI standard control change message, and the second control instruction is an instruction using a MIDI standard system exclusive message.

6. The pedal device according to claim 1, comprising a determination unit configured to determine whether the second control instruction received from the control device via the second communication unit is a control instruction to the pedal device.

7. The pedal device according to claim 6, comprising a modification unit configured to modify the control instruction generated by the input unit according to the second control instruction when it is determined by the determination unit that the second control instruction received from the control device via the second communication unit is the control instruction to the pedal device.

8. The pedal device according to claim 7, wherein the first communication unit performs wireless communication based on the Bluetooth (registered trademark) Low Energy standard.

9. The pedal device according to claim 6, wherein the first communication unit performs wireless communication based on the Bluetooth (registered trademark) Low Energy standard.

10. The pedal device according to claim 1, wherein the first communication unit performs wireless communication based on the Bluetooth (registered trademark) Low Energy standard.

11. The pedal device according to claim 1, wherein the control instruction is an instruction using a MIDI standard control change message, and the second control instruction is an instruction using a MIDI standard system exclusive message.

12. The pedal device according to claim 1, wherein the control device is a portable terminal.

13. A control method executed by a pedal device with a pedal switch configured to control an electronic musical instrument in response to an operation of the pedal switch by a user and relay control from a control device to the electronic musical instrument, and the pedal device is connected to the electronic musical instrument and the control device through wireless communication, the method comprising:

an input step of generating a control instruction in response to an operation of the pedal switch by a user;

a first communication step of wirelessly communicating with the electronic musical instrument;

a second communication step of wirelessly communicating with the control device; and an instruction transmission step of transmitting the control instruction generated in the input step and a second control instruction received from the control device in the second communication step to the electronic musical instrument in the first communication step as different instructions.

14. The control method according to claim 13, wherein, in the instruction transmission step, the control instruction received in the input step and the second control instruction received from the control device in the second communication step are converted into serial data and transmitted to the electronic musical instrument in the first communication step.

15. The control method according to claim 13, comprising a determination step of determining whether the second control instruction received from the control device in the second communication step is a control instruction to the pedal device.

16. The control method according to claim 15, comprising a modification step of changing a control instruction received in the input step according to the second control instruction when it is determined in the determination step that the second control instruction received from the control device in the second communication step is a control instruction to the pedal device.

17. A control system comprising an electronic musical instrument, a control device, and a pedal device with a pedal switch configured to control the electronic musical instrument in response to an operation of the pedal switch by a user and relay control from the control device to the electronic musical instrument, and the pedal device is connected to the electronic musical instrument and the control device through wireless communication, wherein the control device comprises a transmission unit configured to transmit a second control instruction to the pedal device, and the pedal device comprises:

an input unit configured to generate a control instruction in response to the operation of the pedal switch by the user;

a first communication unit configured to wirelessly communicate with the electronic musical instrument;

a second communication unit configured to wirelessly communicate with the control device; and an instruction transmission unit configured to transmit the control instruction generated by the input unit and the second control instruction received from the control device via the second communication unit to the electronic musical instrument via the first communication unit as different instructions.

18. The control system according to claim 17, wherein the instruction transmission unit of the pedal device transmits the control instruction generated by the input unit and the second control instruction received from the control device via the second communication unit to the electronic musical instrument via the first communication unit in a state in which the instructions are converted into serial data.

19. The control system according to claim 17, wherein the pedal device comprises a determination unit configured to determine whether the second control instruction received from the control device via the second communication unit is a control instruction to the pedal device.

20. The control system according to claim 19, wherein the pedal device comprises a modification unit configured to change the control instruction generated by the input unit according to the second control instruction when it is determined by the determination unit that the second control instruction received from the control device via the second communication unit is a control instruction to the pedal device.

* * * * *